(12) United States Patent
Zhang et al.

(10) Patent No.: US 12,389,438 B2
(45) Date of Patent: Aug. 12, 2025

(54) AGGRESSOR NETWORK NODE DETERMINATION TO APPLY RESTRICTION RULE

(71) Applicant: QUALCOMM Incorporated, San Diego, CA (US)

(72) Inventors: Qian Zhang, Basking Ridge, NJ (US); Yan Zhou, San Diego, CA (US); Navid Abedini, Basking Ridge, NJ (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 346 days.

(21) Appl. No.: 17/554,136

(22) Filed: Dec. 17, 2021

(65) Prior Publication Data

US 2023/0199816 A1    Jun. 22, 2023

(51) Int. Cl.
*H04W 72/541*    (2023.01)
*H04W 72/02*    (2009.01)
*H04W 72/0446*    (2023.01)
*H04W 72/21*    (2023.01)

(52) U.S. Cl.
CPC ......... *H04W 72/541* (2023.01); *H04W 72/02* (2013.01); *H04W 72/0446* (2013.01); *H04W 72/21* (2023.01)

(58) Field of Classification Search
CPC ............... H04W 72/541; H04W 72/02; H04W 72/0446; H04W 72/21; H04W 72/27
See application file for complete search history.

(56) References Cited

U.S. PATENT DOCUMENTS

| | | | | |
|---|---|---|---|---|
| 2019/0141554 | A1* | 5/2019 | Siomina | H04W 64/003 |
| 2020/0036459 | A1* | 1/2020 | Menon | H04B 17/391 |
| 2021/0306127 | A1* | 9/2021 | Sundberg | H04L 5/0048 |
| 2022/0191801 | A1* | 6/2022 | Fröberg Olsson | H04W 52/146 |
| 2023/0422202 | A1* | 12/2023 | Manolakos | H04W 64/00 |

FOREIGN PATENT DOCUMENTS

CN    109691166 B    *    5/2022    ........... H04L 5/0051

* cited by examiner

*Primary Examiner* — Edan Orgad
*Assistant Examiner* — Raul Rivas
(74) *Attorney, Agent, or Firm* — Holland & Hart LLP

(57) ABSTRACT

Methods, systems, and devices for wireless communications are described. A first network node may receive, in a first time interval, interference signals from a second network node on a portion of uplink resources used by the first network node to receive from a first set of wireless devices served by the first network node in the first time interval. The first network node may transmit, to the second network node, an identifier associated with the second network node and an indication that the second network node is to modify transmission on downlink resources used by the second network node to transmit to a second set of wireless devices served by the second network node. Transmitting the indication that the second network node is to modify transmission on the downlink resources includes transmitting, to the second network node, a signal configured to indicate modifying the transmission on the downlink resources.

26 Claims, 12 Drawing Sheets

Downlink (DL) Transmission 205

Uplink (UL) Transmission 210

200

AGGRESSOR NETWORK NODE DETERMINATION TO APPLY RESTRICTION RULE

FIELD OF TECHNOLOGY

The present disclosure relates to wireless communications, including aggressor network node determination to apply a restriction rule.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some base stations or network access nodes (e.g., nodes of an integrated access and backhaul (IAB), such as a distributed unit (DU) or central unit (CU)), which may generally be referred to as network nodes herein, may be configured for communications with other base stations or network nodes. For example, base stations may be configured for inter-base station communications via one or more backhaul links (e.g., which may be wired links in some examples). Additionally or alternatively, base stations may communicate using wireless communications or over-the-air (OTA) interfaces. Some wireless communications systems may support full-duplex (FD) communications by network nodes with UEs served by those network nodes. For example, one or more network nodes (e.g., a base station, or any other network node) may be capable of simultaneously transmitting downlink (DL) communications and receiving uplink (UL) communications. In other cases, one network node may transmit DL communications and another network node (e.g., a neighboring network node) may be attempting to receive UL communications. However, in some cases, a network node may transmit signaling (e.g., signaling using one or more resources for FD communications), may be received by other network nodes as interference. In some cases, a network node receiving interference (e.g., a victim base station) may be unable to effectively communicate to the transmitting network node (e.g., an aggressor base station) that the interference is occurring. In some cases, the network node receiving interference (e.g., the victim base station) may be unable to identify the network node transmitting interference (e.g., the aggressor base station) or synchronize communication timing with the network node transmitting interference.

SUMMARY

The present disclosure relates to improved methods, systems, devices, and apparatuses that support aggressor network node determination to apply a restriction rule. Generally, the described techniques provide for a first network node (e.g., a victim base station) transmitting, to a second network node (e.g., an aggressor base station) an identifier (ID) associated with the second network node and an indication that the second network node is to modify transmission on one or more downlink (DL) resources. The first network node may transmit the ID and the indication via an over-the-air (OTA) channel. The indication may indicate a restricted time window, an indication of a non-restricted time window, an indication of a time window for reduced transmission power, an indication of a restricted beam, an indication of a transmit receive point (TRP) identifier, or any combination thereof. The second network node may receive the ID and determine that the ID is associated with the second network node. Accordingly, the second network node may determine to modify transmissions of DL messages, for example such that interference at the first network node is reduced or eliminated.

A method for wireless communication at a first network node is described. The method may include receiving, in a first time interval, interference signals from a second network node on at least a portion of uplink resources used by the first network node to receive from a first set of wireless devices served by the first network node in the first time interval and transmitting, to the second network node, an identifier associated with the second network node and an indication that the second network node is to modify transmission on downlink resources used by the second network node to transmit to a second set of wireless devices served by the second network node.

An apparatus for wireless communication at a first network node is described. The apparatus may include a processor, memory coupled with the processor, and instructions stored in the memory. The instructions may be executable by the processor to cause the apparatus to receive, in a first time interval, interference signals from a second network node on at least a portion of uplink resources used by the first network node to receive from a first set of wireless devices served by the first network node in the first time interval and transmit, to the second network node, an identifier associated with the second network node and an indication that the second network node is to modify transmission on downlink resources used by the second network node to transmit to a second set of wireless devices served by the second network node.

Another apparatus for wireless communication at a first network node is described. The apparatus may include means for receiving, in a first time interval, interference signals from a second network node on at least a portion of uplink resources used by the first network node to receive from a first set of wireless devices served by the first network node in the first time interval and means for transmitting, to the second network node, an identifier associated with the second network node and an indication that the second network node is to modify transmission on downlink resources used by the second network node to transmit to a second set of wireless devices served by the second network node.

A non-transitory computer-readable medium storing code for wireless communication at a first network node is described. The code may include instructions executable by a processor to receive, in a first time interval, interference signals from a second network node on at least a portion of uplink resources used by the first network node to receive from a first set of wireless devices served by the first network node in the first time interval and transmit, to the second network node, an identifier associated with the second network node and an indication that the second network node is to modify transmission on downlink resources used by the second network node to transmit to a second set of wireless devices served by the second network node.

In some examples of the method, apparatuses, and non-transitory computer-readable medium described herein, transmitting the indication that the second network node may be to modify transmission on the downlink resources may include operations, features, means, or instructions for transmitting, to the second network node, a signal configured to indicate modifying the transmission on the downlink resources.

In some examples of the method, apparatuses, and non-transitory computer-readable medium described herein, transmitting the indication that the second network node may be to modify transmission on the downlink resources may include operations, features, means, or instructions for transmitting, to the second network node, an indication of a set of resources on which full duplex operation may be disallowed by the second network node or transmission by the second network node on downlink may be disallowed during one or more time periods during which the first network node may be receiving on uplink.

In some examples of the method, apparatuses, and non-transitory computer-readable medium described herein, transmitting the indication that the second network node may be to modify transmission on the downlink resources may include operations, features, means, or instructions for transmitting, to the second network node, an indication of a set of resources on which full duplex operation or transmission by the second network node may be allowed during one or more time periods according to a transmit power backoff value.

In some examples of the method, apparatuses, and non-transitory computer-readable medium described herein, transmitting the indication that the second network node may be to modify transmission on the downlink resources may include operations, features, means, or instructions for transmitting, to the second network node, an indication of one or more beam configurations that the second network node may be restricted from using on resources of full duplex operation or for transmission by the second network node on downlink during one or more time periods during which the first network node may be receiving on uplink.

Some examples of the method, apparatuses, and non-transitory computer-readable medium described herein may further include operations, features, means, or instructions for performing a measurement procedure for the interference signals from the second network node according to a measurement time window aligned with a reference signal received from the second network node.

Some examples of the method, apparatuses, and non-transitory computer-readable medium described herein may further include operations, features, means, or instructions for performing a measurement procedure for the interference signals from the second network node according to a measurement time window aligned with a timing for uplink signals received from the first set of wireless devices served by the first network node.

Some examples of the method, apparatuses, and non-transitory computer-readable medium described herein may further include operations, features, means, or instructions for receiving a reference signal associated with a cross-link interference measurement procedure and determining the identifier associated with the second network node based on the reference signal associated with the cross-link interference measurement procedure.

In some examples of the method, apparatuses, and non-transitory computer-readable medium described herein, transmitting the indication that the second network node may be to modify transmission on the downlink resources may include operations, features, means, or instructions for transmitting, to the second network node, an identifier of a transmission reception point associated with the second network node that the second network node may be restricted from using.

In some examples of the method, apparatuses, and non-transitory computer-readable medium described herein, the identifier of the transmission reception point may be associated with a control resource set pool index or a physical cell identifier.

Some examples of the method, apparatuses, and non-transitory computer-readable medium described herein may further include operations, features, means, or instructions for determining to transmit to the second network node the indication to modify transmission on the downlink resources based on identifying that synchronization signal blocks received from the second network node may be associated with a higher reference signal received power (RSRP) than a threshold value or the RSRP for the synchronization signal blocks may be within a receive power range.

In some examples of the method, apparatuses, and non-transitory computer-readable medium described herein, an indication of the threshold value, the receive power range, or both, may be transmitted by the first network node, an indication of the threshold value, the receive power range, or both, may be received from a distributed unit or a central unit in communication with the first network node, and the threshold value, the receive power range, or both may be configured at the first network node.

A method for wireless communication at a second network node is described. The method may include transmitting a first set of downlink messages on downlink resources to a second set of wireless devices served by the second network node, a first set of wireless devices served by a first network node, receiving, from the first network node, an identifier of the second network node and an indication that the second network node is to modify transmission on the downlink resources, and transmitting a second set of downlink messages on the downlink resources to the second set of wireless devices in accordance with the indication to modify transmission on the downlink resources.

An apparatus for wireless communication at a second network node is described. The apparatus may include a processor, memory coupled with the processor, and instructions stored in the memory. The instructions may be executable by the processor to cause the apparatus to transmit a first set of downlink messages on downlink resources to a second set of wireless devices served by the second network node, a first set of wireless devices served by a first network node, receive, from the first network node, an identifier of the second network node and an indication that the second network node is to modify transmission on the downlink resources, and transmit a second set of downlink messages on the downlink resources to the second set of wireless devices in accordance with the indication to modify transmission on the downlink resources.

Another apparatus for wireless communication at a second network node is described. The apparatus may include means for transmitting a first set of downlink messages on downlink resources to a second set of wireless devices served by the second network node, a first set of wireless devices served by a first network node, means for receiving, from the first network node, an identifier of the second network node and an indication that the second network node is to modify transmission on the downlink resources, and means for transmitting a second set of downlink messages on the downlink resources to the second set of wireless devices in accordance with the indication to modify transmission on the downlink resources.

A non-transitory computer-readable medium storing code for wireless communication at a second network node is described. The code may include instructions executable by a processor to transmit a first set of downlink messages on downlink resources to a second set of wireless devices served by the second network node, a first set of wireless devices served by a first network node, receive, from the first network node, an identifier of the second network node and an indication that the second network node is to modify transmission on the downlink resources, and transmit a second set of downlink messages on the downlink resources to the second set of wireless devices in accordance with the indication to modify transmission on the downlink resources.

In some examples of the method, apparatuses, and non-transitory computer-readable medium described herein, receiving the indication that the second network node may be to modify transmission on the downlink resources may include operations, features, means, or instructions for receiving, from the first network node, a reference signal configured to indicate modifying the transmission on the downlink resources.

In some examples of the method, apparatuses, and non-transitory computer-readable medium described herein, receiving the indication that the second network node may be to modify transmission on the downlink resources may include operations, features, means, or instructions for receiving, from the first network node, an indication of a set of resources on which full duplex operation may be disallowed by the second network node or transmission by the second network node on downlink may be disallowed during one or more time periods during which the first network node may be receiving on uplink.

In some examples of the method, apparatuses, and non-transitory computer-readable medium described herein, receiving the indication that the second network node may be to modify transmission on the downlink resources may include operations, features, means, or instructions for receiving, from the first network node, an indication of a set of resources on which full duplex operation or transmission by the second network node may be allowed during one or more time periods according to a transmit power backoff value.

In some examples of the method, apparatuses, and non-transitory computer-readable medium described herein, receiving the indication that the second network node may be to modify transmission on the downlink resources may include operations, features, means, or instructions for receiving, from the first network node, an indication of one or more beam configurations that the second network node may be restricted from using on resources of full duplex operation or for transmission by the second network node on downlink during one or more time periods during which the first network node may be receiving on uplink.

In some examples of the method, apparatuses, and non-transitory computer-readable medium described herein, receiving the indication that the second network node may be to modify transmission on the downlink resources may include operations, features, means, or instructions for receiving, from the first network node, an identifier of a transmission reception point associated with the second network node that the second network node may be restricted from using.

DETAILED DESCRIPTION

Figure 1:
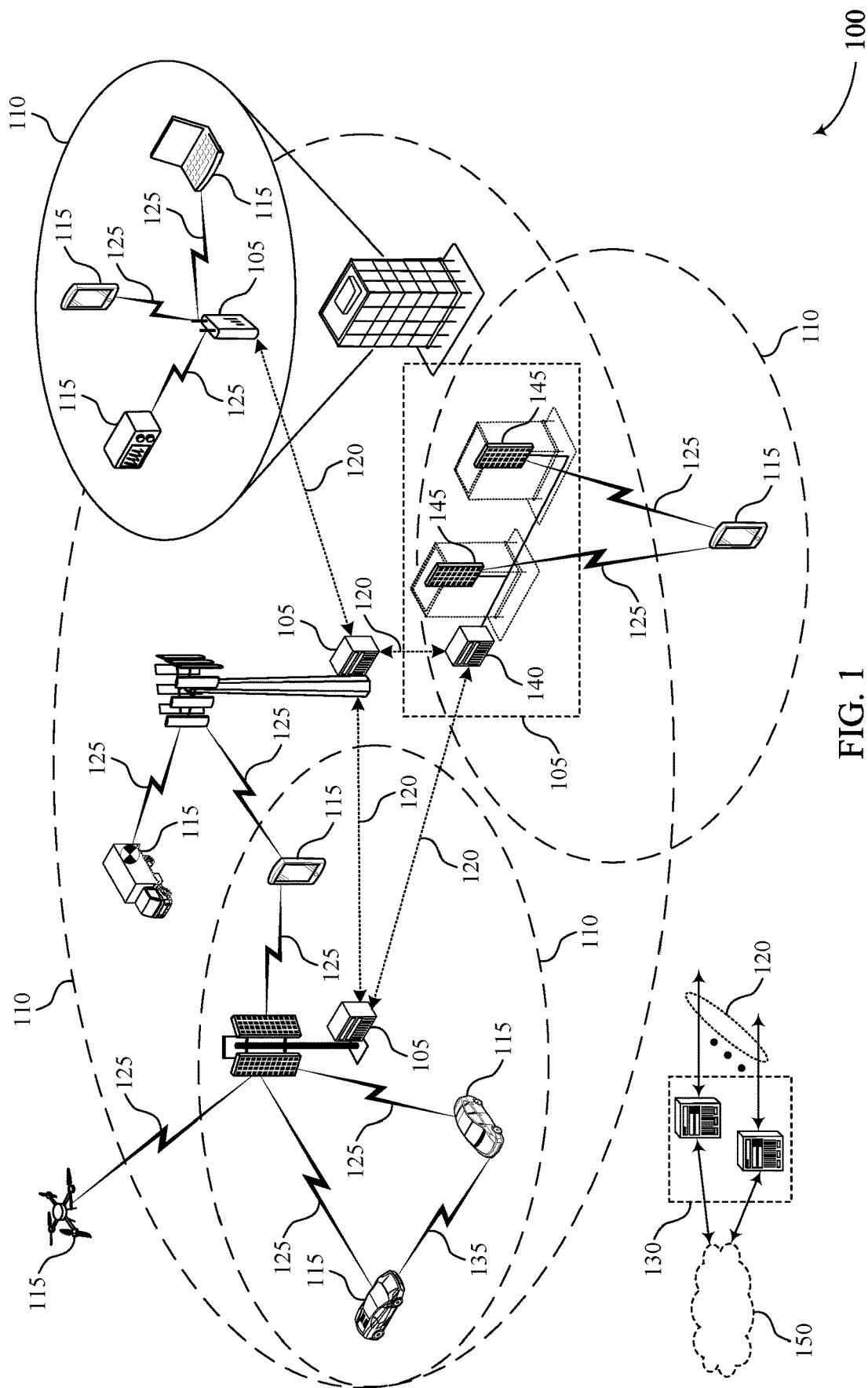
FIG. 1 illustrates an example of a wireless communications system that supports aggressor network node determination to apply a restriction rule in accordance with aspects of the present disclosure.

Some wireless communications systems may support full-duplex (FD) communications between network nodes, or half-duplex (HD) communications where one network node receives (e.g., on uplink (UL)) while another network node transmits (e.g., on downlink (DL)). For example, one or more network nodes (e.g., a base station, a user equipment (UE), or any other network node) may be capable of simultaneously transmitting downlink (DL) communications and receiving uplink (UL) communications. In some cases, a network node may simultaneously transmit DL communications and receive UL communications using one or more antenna elements or one or more transmit receive points (TRPs). However, in some cases, a network node may transmit signaling (e.g., signaling using one or more resources for FD or HD communications), which may be received by other network nodes as interference. In some cases, a network node receiving interference (e.g., a victim base station) may be unable to effectively communicate to the transmitting network node (e.g., an aggressor base station) that the interference is occurring. For example, a network node such as a base station may be configured for communications via one or more backhaul links, however, the one or more backhaul links may introduce a communication delay, which may be undesirable. Additionally or alternatively, the network node receiving interference (e.g., the victim base station) may be unable to identify the network node transmitting interference (e.g., the aggressor base station) or synchronize communication timing with the network node transmitting interference.

In accordance with the techniques described herein, a first network node (e.g., a victim base station) may transmit control signaling using an over-the-air (OTA) channel, to a second network node (e.g., an aggressor base station). The control signaling may indicate that the second network node is to modify transmissions on one or more DL resources based on the first network node detecting interference associated with the one or more DL resources. The control signaling may include an indication of a restricted time window, an indication of a non-restricted time window, an indication of a time window for reduced transmission power, an indication of a restricted beam, an indication of a transmit receive point (TRP) identifier, or any combination thereof. The first network node may determine one or more identifiers associated with the second network node based on receiving the interference or receiving a reference signal (RS) from the second network node. The second network node may receive the control signaling and determine that the indicated ID is associated with the second network node. Accordingly, the second network node may determine to modify transmissions of DL messages such that interference at the first network node is reduced or eliminated.

Aspects of the disclosure are initially described in the context of wireless communications systems. Aspects of the disclosure are further illustrated by and described with reference to apparatus diagrams, system diagrams, and flowcharts that relate to aggressor network node determination to apply a restriction rule.

FIG. 1 illustrates an example of a wireless communications system 100 that supports aggressor network node determination to apply a restriction rule in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, base station 105, entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In accordance with the techniques described herein, a base station 105, which receives interference, may transmit control signaling using an OTA channel, to a base station 105, which transmits the interference. The control signaling may indicate that the transmitting base station 105 is to modify transmissions on one or more DL resources based on the receiving base station 105 detecting interference associated with the one or more DL resources. The control signaling may include an indication of a restricted time window, an indication of a non-restricted time window, an indication of a time window for reduced transmission power, an indication of a restricted beam, an indication of a TRP identifier, or any combination thereof. The base station 105, which transmits the interference, may determine to modify transmissions of DL messages such that interference at the receiving base station 105 is reduced or eliminated. While some examples described herein may be described with reference to base stations 105, it is understood that the described techniques may be applied to base stations 105, UEs 115, or any other network nodes.

Figure 2:
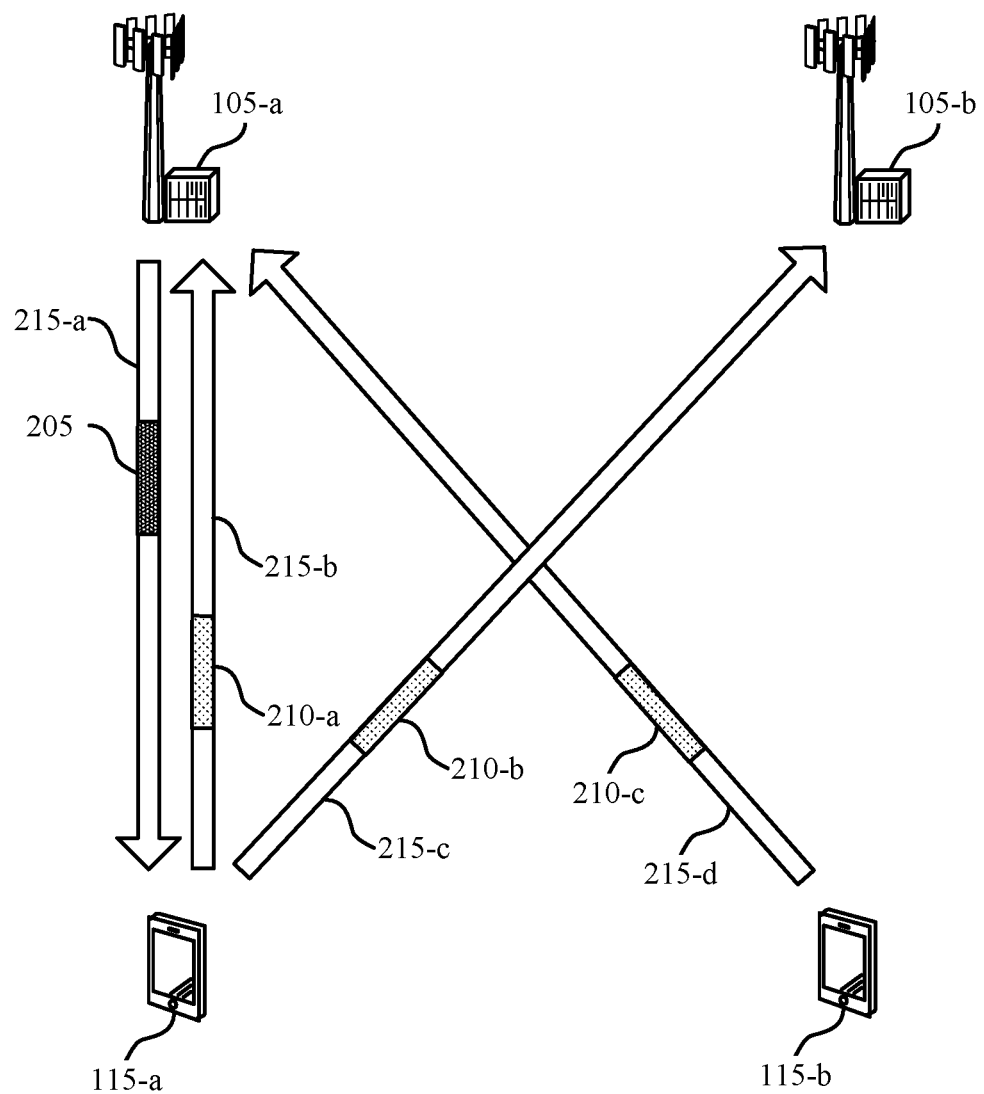
FIG. 2 illustrates an example of a wireless communications system that supports aggressor network node determination to apply a restriction rule in accordance with aspects of the present disclosure.
Figure 2:
Figure 2:

FIG. 2 illustrates an example of a wireless communications system 200 that supports aggressor network node determination to apply a restriction rule in accordance with aspects of the present disclosure. The wireless communications system 200 may implement aspects of the wireless communications system 100. For example, the wireless communications system 200 may include a base station 105-a, a base station 105-b, a UE 115-a, and a UE 115-b, which may be examples of corresponding base station 105 and UEs 115 as described with reference to FIG. 1. One or more of the base station 105-a, the base station 105-b, the UE 115-a, and the UE 115-b may communicate over one or more of a communication link 215, which may be examples of communication links 125 as described with reference to FIG. 1. In some cases, communication link 215-a may be an example of a DL communication link 215. In some cases, communication link 215-b, communication link 215-c, and communication link 215-d may be examples of UL communication links 215. Although examples described herein generally refer to base stations 105, it is understood that base stations 105 may be examples of network nodes. That is, the term base station 105 and network node may be used interchangeably.

The base station 105-a and the base station 105-b may communicate via inter-base station 105 communications. As described herein, and as described with further detail in FIG. 3, the base stations 105 may communicate over one or more backhaul links or using wireless communications. In some cases, the base stations 105 may communicate using wireless communications via one or more OTA links. In some cases, the base stations 105 may be examples of TRPs. Additionally or alternatively, a base station 105 may include one or more TRPs. For example, a base station 105 may transmit a first DL transmission 205 using a first TRP and a second DL transmission 205 using a second TRP. In some examples, one or more of the base stations 105 may be one or more other network nodes, such as one or more nodes of an IAB network, such as a distributed unit (DU) or central unit (CU).

A base station 105 may operate in an FD mode, in which the base station 105 may transmit a DL transmission 205 using a first antenna panel while concurrently receiving a UL transmission 210 using a second antenna panel. For example, the base station 105-a may transmit a DL transmission 205 to the UE 115-a while concurrently receiving a UL transmission 210-c from the UE 115-b. In some cases, a UE 115 may also operate in an FD mode, in which the UE 115 may transmit a UL transmission 210 using a first antenna panel while concurrently receiving a DL transmission 205 using a second antenna panel. For example, the UE 115-a may receive the DL transmission 205 from the base station 105-a while concurrently transmitting the UL transmission 210-b to the base station 105-b. In some cases, the UE 115 and the base station 105 may apply respective parameters for operation in FD and half-duplex (HD) modes. For example, the UE 115 or the base station 105 may switch between an FD mode and an HD mode by updating a beam pair parameter, a modulation and coding scheme (MCS), a transmit power, a precoder, a rank indicator (RI), a timing advance (TA) value, a guard band parameter, or other parameters that correspond to either the HD mode or the FD mode. In some cases, base stations 105 and UEs 115 may communicate using one or more frequency bands associated with Frequency Range 2 (FR2).

A wireless device may operate in a time division duplex (TDD) mode. In some cases, a wireless device may be unable to operate in an FD mode and may alternatively operate in a TDD mode (e.g., using HD). In some cases, a wireless device may operate according to both an HD mode and a TDD mode. A TDD mode may enable a wireless device to transmit multiple communications using a same frequency band. While operating in a TDD mode, a wireless device may transmit a first message at a first time and a second message at a second time. The wireless device may transmit the first message and the second message using the same frequency band. In some cases, operating according to a TDD mode may enable a wireless device to improve resource utilization for communicating multiple transmissions using a single antenna.

In some cases (e.g., in a first use case), a UE 115, such as the UE 115-a, may be FD enabled (e.g., operating in an FD mode), and communicate with multiple base stations 105 that may be FD disabled (e.g., not operating in an FD mode). The UE 115-a may transmit a UL transmission 210-b to the base station 105-b and concurrently receive a DL transmission 205 from the base station 105-a. In some cases (e.g., in a second use case), a base station 105, such as the base station 105-a, may be FD enabled and communicate with multiple UEs 115 that may be FD disabled. The base station 105-a may transmit a DL transmission 205 to the UE 115-a and may concurrently receive a UL transmission 210-c from the UE 115-b. In some cases (e.g., in a third use case), a UE 115 and a base station 105, such as the UE 115-a and the base station 105-a, may both be FD enabled. The UE 115-a may transmit a UL transmission 210-a to the base station 105-a and may concurrently receive a DL transmission 205 from the base station 105-a. While the examples described herein may be described in accordance with the second use case, additional examples in accordance with the first, third, and other use cases may be implemented.

Some wireless devices (e.g., the base stations 105 and the UEs 115) operating in an FD mode may produce and be affected by interference, such as self-interference. For example, the UE 115-a may transmit, to the base station 105-a, the UL transmission 210-a. The UE 115-a may concurrently receive, from the base station 105-a, the DL transmission 205. In some cases, if the UL transmission 210-a and the DL transmission 205 are transmitted on overlapping time-frequency resources, the UL transmission 210-a may interfere with the DL transmission 205 (e.g., the UL transmission 210-a may leak to receive antennas at the UE 115-a). In some cases, self-interference may increase a noise floor of a wireless device and result in inefficient utilization of allocated resources. Self-interference may impact DL traffic, UL traffic, or both. In some cases, FD capability may be conditional on beam separation (e.g., separation between a beam used for the DL transmission 205 and a beam used for the UL transmission 210-a). FD capability may additionally be conditional on self-interference cancelation capabilities of a UE 115 and the extent of clutter echo (e.g., self-interference caused by reflections), among other aspects.

One or more benefits may be associated with operating in an FD mode. For example, wireless devices (e.g., the base stations 105 and the UEs 115) may operate in an FD mode, which may result in latency reduction. That is, a wireless device may transmit and receive messages simultaneously, which may increase a throughput of communications associated with the device. As a result, a wireless device may improve the utilization of time-frequency resources, which may reduce latency associated with wireless communications. In some cases, a wireless device operating in an FD mode may be capable of receiving DL signaling in one or more slots otherwise associated with UL signaling. Similarly, a wireless device operating in an FD mode may be capable of transmitting UL signaling in one or more slots otherwise associated with DL signaling. In such cases, latency associated with the UL and DL signaling may be reduced. Additionally or alternatively, operating in an FD mode may increase spectral efficiency (e.g., per cell, per UE 115), increase resource utilization efficiency and improve wireless coverage (e.g., coverage may be enhanced using continuous UL and DL transmission repetitions).

In some cases, a base station 105 may receive interference from a neighboring base station 105. For example, the base station 105-b may transmit one or more DL transmissions 205 to the UE 115-b. However, the base station 105-a may receive the one or more DL transmissions 205 as interference. In such cases, the base station 105-b, which transmits interference, may be referred to as an aggressor base station 105. Similarly, the base station 105, which receives interference, may be referred to as a victim base station 105-a. In accordance with examples described herein, the base station 105-b may be an aggressor base station 105 or a victim base station 105. Similarly, the base station 105-a may be an aggressor base station 105 or a victim base station 105.

In some cases, a victim base station 105 may be unable to effectively communicate to the aggressor base station 105 that interference is occurring. For example, the base station 105-a and the base station 105-b may be configured to transmit and receive inter-base station 105 communications using one or more backhaul links. However, the one or more backhaul links may introduce a communication delay, which may be undesirable. Additionally or alternatively, the victim base station 105 may be unable to identify the aggressor base station 105 or synchronize communication timing with the aggressor base station 105.

In accordance with the techniques described herein, a victim base station 105 may transmit signaling to an aggressor base station 105 via an OTA channel. The signaling may indicate one or more resource restrictions, which may enable the base stations 105 to mitigate inter-base station 105 interference. In some cases, the inter-base station 105 interference may be associated with a base station 105 operating in an FD mode or a TDD mode. In some cases, the interference may be associated with a base station 105 operating in a TDD mode, for example with flexible and/or misaligned resources. In some cases, the aggressor base station 105 may receive the signaling and may determine to refrain from transmitting based on receiving the signaling. In some other cases, the aggressor base station 105 may receive the signaling and may determine to transmit one or more downlink messages in accordance with one or more resource restrictions indicated by the signaling.

Figure 3:
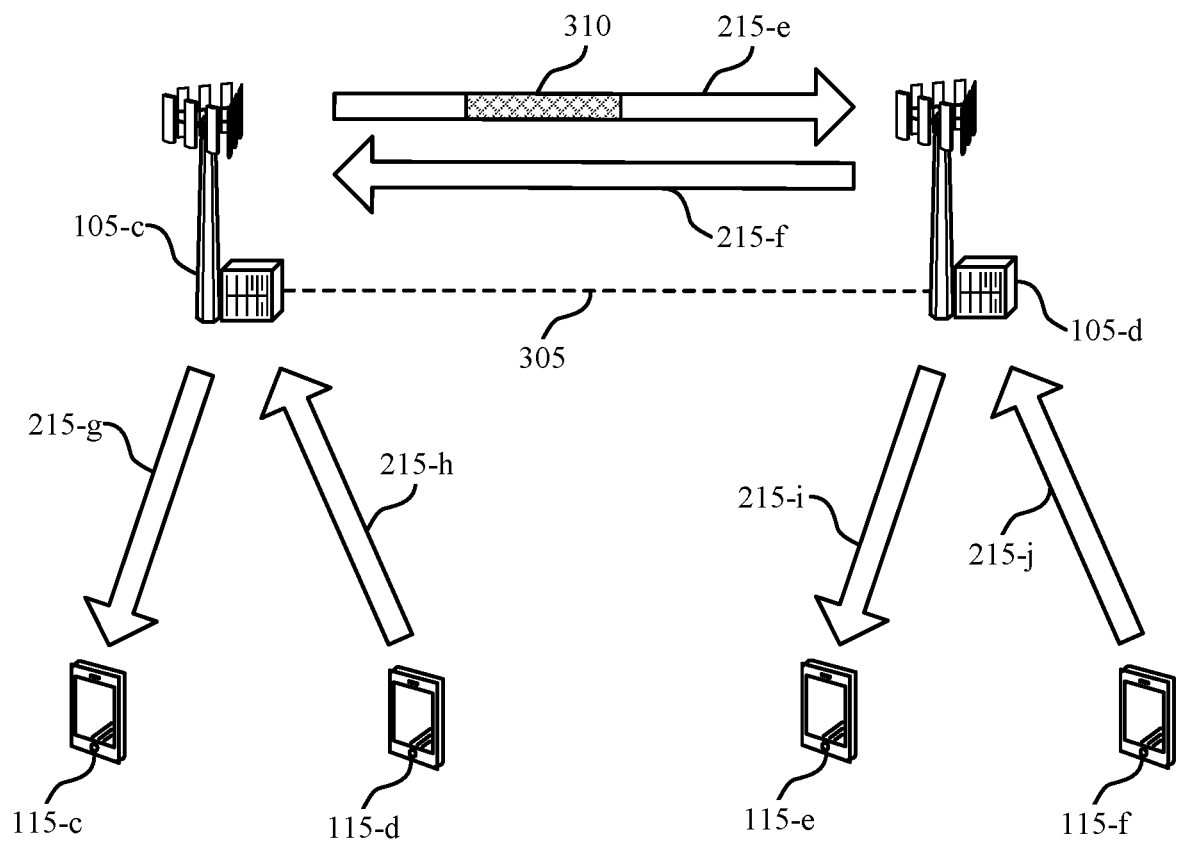
FIG. 3 illustrates an example of a wireless communications system that supports aggressor network node determination to apply a restriction rule in accordance with aspects of the present disclosure.

FIG. 3 illustrates an example of a wireless communications system 300 that supports aggressor network node determination to apply a restriction rule in accordance with aspects of the present disclosure. The wireless communications system 300 may implement aspects of the wireless communications system 100 and the wireless communications system 200. For example, the wireless communications system 300 may include a base station 105-c, a base station 105-d, a UE 115-c, a UE 115-d, a UE 115-e, and a UE 115-f, which may be examples of corresponding base stations 105 and UEs 115 as described with reference to FIGS. 1 and 2. Additionally or alternatively, the wireless communications system 300 may include communication link 215-e, communication link 215-f, communication link 215-g, communication link 215-h, communication link 215-i, and communication link 215-j which may be examples of corresponding communication links 125 and communication links 215 as described with reference to FIGS. 1 & 2. In some cases, base stations 105 may communicate using one or more of communication link 215-e, communication link 215-f, and a backhaul link 305. Although examples described herein generally refer to base stations 105, it is understood that base stations 105 may be examples of network nodes. That is, the term base station 105 and network node may be used interchangeably.

As described herein, a base station 105 may receive interference from a neighboring base station 105. For example, the base station 105-d may transmit one or more DL transmissions to the UE 115-e via the communication link 215-*i*, which may be an example of a DL communication link 215. The base station 105-*d* may transmit the one or more DL transmissions according to an or an HD mode. In some cases, the base station 105-*d* may transmit the one or more DL transmissions using a TDD mode. In some cases, although the one or more DL transmissions may be intended for the UE 115-*e*, the base station 105-*c* may receive (e.g., may inadvertently receive) the one or more DL transmissions as interference. In such cases, the base station 105-*d*, which transmits interference, may be referred to as an aggressor base station 105. Similarly, the base station 105-*c*, which receives interference, may be referred to as a victim base station 105. In accordance with examples described herein, the base station 105-*d* may be an aggressor base station 105 or a victim base station 105. Similarly, the base station 105-*c* may be an aggressor base station 105 or a victim base station 105.

In accordance with the techniques described herein, the victim base station 105-*c* may transmit signaling 310 (e.g., dynamically) to the aggressor base station 105-*d*. The signaling 310 may indicate a restriction of one or more transmissions from the aggressor base station 105-*d*, which may enable the base stations 105 to mitigate interference. For example, the signaling 310 may include an identifier associated with the aggressor base station 105-*d*. Additionally or alternatively, the signaling 310 may include an indication that the aggressor base station 105-*d* is to restrict one or more resources for DL transmissions (e.g., DL transmissions, which may be transmitted by the base station 105-*d* in an FD mode or an HD mode). In some cases, the victim base station 105-*c* may transmit the signaling 310 to the aggressor base station 105-*d* via the communication link 215-*e*. Additionally or alternatively, the base station 105-*c* may broadcast, groupcast, or multicast the signaling 310. For example, the victim base station 105-*c* may broadcast the signaling 310 to a quantity of base stations 105 within a range of the victim base station 105-*c*.

The victim base station 105-*c* may transmit the signaling 310 to the aggressor base station 105-*d* using an OTA communication link 215-*e*, which may reduce signaling overhead and latency. For example, the base station 105-*c* may not transmit the signaling 310 to the aggressor base station 105-*d* using the backhaul link 305, which may be a non-ideal backhaul link 305. Additionally or alternatively, the backhaul link 305 may introduce signaling latency. In some other cases, the base station 105-*c* and the base station 105-*d* may not be connected via a backhaul link 305. As a result, the base station 105-*c* and the base station 105-*d* may not be capable of communicating via a backhaul link 305. In some cases, the signaling 310 may include one or more control signals, one or more reference signals (RSs), one or more physical downlink control channel (PDCCH) messages, one or more physical downlink shared channel (PDSCH) messages, or any combination thereof.

In some cases (e.g., according to a first option), the signaling 310 may include an indication of a resource restriction (e.g., a predetermined resource restriction) associated with a time window (e.g., the indication may restrict FD communications or a reverse direction transmission, such as a reverse direction transmission using a TDD mode). That is, the signaling 310 may indicate that the aggressor base station 105-*d* may not transmit using one or more resources within a time window. In some cases, the signaling 310 may include an RS. For example, the victim base station 105-*c* may periodically or a-periodically transmit one or more RSs associated with a channel state information (CSI) procedure, a cross link interference (CLI) measurement procedure, or both. In some cases, one or more base stations 105 may be configured to transmit RSs, which may include transmitting one or more RSs using time resources, which may be shared among a quantity of base stations 105. For example, the victim base station 105-*c* and the aggressor base station 105-*d* may be configured to perform one or more CLI measurement procedures using shared time resources. Accordingly, the victim base station 105-*c* may transmit signaling 310 (e.g., an RS) using time resources, which the aggressor base station 105-*d* may be configured to monitor. Consequently, the base station 105-*d* may receive the signaling 310 (e.g., the RS) based on monitoring for the signaling 310. In some other cases, the signaling 310 may include a PDCCH message, a PDSCH message, or any other type of signaling 310.

In some cases (e.g., according to a second option), the signaling 310 may include an indication to allow communications associated with a time window (e.g., the indication may indicate that FD communications or reverse direction transmissions are allowed). That is, the signaling 310 may indicate that the aggressor base station 105-*d* may transmit within a time window. In some cases, the signaling 310 may include one or more RSs, one or more PDCCH messages, one or more PDSCH messages, or any other type of signaling 310. Accordingly, the aggressor base station 105-*d* may receive the signaling 310 and may determine to transmit DL communications to the UE 115-*e* based on receiving the signaling 310.

In some cases (e.g., according to a third option), the signaling 310 may include an indication to reduce a transmission power. That is, the signaling 310 may indicate that the aggressor base station 105-*d* is to reduce a power of one or more transmissions, which may interference with the victim base station 105-*c*. In some cases, the signaling 310 may indicate a decibel (dB) value associated with the power reduction. Additionally or alternatively, the signaling 310 may include an indication of a time window for which the transmission power is to be reduced. Accordingly, the aggressor base station 105-*d* may receive the signaling 310 and may determine to reduce a transmission power for DL communications to the UE 115-*e* based on receiving the signaling 310. Additionally or alternatively, the aggressor base station 105-*d* may reduce the transmission power for the DL communications during a time window based on receiving the signaling 310.

In some cases (e.g., according to a fourth option), the signaling 310 may include an indication of one or more beam configurations. That is, the signaling 310 may indicate one or more preferred beams, one or more restricted beams, or any combination thereof. In some cases, the signaling 310 may include an indication of one or more restricted beams. The one or more restricted beams may be associated with interference at the victim base station 105-*c*. Additionally or alternatively, the signaling 310 may include an indication of at time window for which the beam configuration should be applied. Accordingly, the aggressor base station 105-*d* may receive the signaling 310 and may determine to use one or more beams for DL communications with the UE 115-*e* based on receiving the signaling 310. Additionally or alternatively, the aggressor base station 105-*d* may use the one or more beams for DL communications during the time window indicated by the signaling 310.

In some cases (e.g., according to a fifth option), the signaling 310 may include an indication of one or more restrictions associated with one or more TRP identifiers (IDs). That is, the signaling 310 may indicate one or more TRP IDs. The one or more TRPs may be associated with one or more aggressor base stations 105-*d*. For example, the aggressor base station 105-*d* may include one or more TRPs. In some cases, the one or more restricted TRPs may be associated with a control resource set (CORESET) pool index (e.g., CORESETPoolIndex) or a physical cell identifier (PCI). In some cases, the signaling 310 may indicate that the aggressor base station 105-*d* may not transmit in a reverse direction or may not transmit using an FD mode. Accordingly, the aggressor base station 105-*d* may receive the signaling 310 and may determine not to transmit using one or more TRPs.

The victim base station 105-*c* may receive one or more RSs from the aggressor base station 105-*d*. For example, the aggressor base station 105-*d* may perform one or more CSI procedures associated with transmitting DL communications to the UE 115-*e*. The CSI procedure may include transmitting one or more RSs to the UE 115-*e*. However, the one or more RSs may be received by the victim base station 105-*c* as interference. In some cases, the one or more RSs may include an ID associated with the aggressor base station 105-*d*. Additionally or alternatively, the aggressor base station 105-*d* may transmit the one or more RSs according to a timing. Additionally or alternatively, the aggressor base station 105-*d* may monitor for transmissions based on the timing. In some cases, the victim base station 105-*c* may receive the one or more RSs from the aggressor base station 105-*d* and determine the timing. Accordingly, the victim base station 105-*c* may transmit the signaling 310 to the aggressor base station 105-*d* based on the timing. As a result, the aggressor base station 105-*d* may receive the signaling 310 (e.g., according to the timing).

In some other cases, the victim base station 105-*c* may not receive one or more RSs from the aggressor base station 105-*d*. Accordingly, the victim base station 105-*c* may not determine a timing associated with the aggressor base station 105-*d*. In such cases, the victim base station 105-*c* may transmit the signaling 310 to the aggressor base station 105-*d* based on a timing associated with receiving UL transmissions at the victim base station 105-*c*. In some cases, the base station 105-*c* may measure a received signal strength indication (RSSI) associated with receiving one or more UL transmissions. The base station 105-*c* may not measure the RSSI based on a dedicated time window. In some cases, the aggressor base station 105-*d* may receive the signaling 310 according to the timing associated with the victim base station 105-*c* receiving UL transmissions.

The signaling 310 may include an ID of one or more aggressor base stations 105. In some cases, a victim base station 105 may identify one or more aggressor base station 105 IDs via one or more RSs transmitted by one or more aggressor base stations 105. For example, the aggressor base station 105-*d* may transmit one or more RSs as part of a CLI measurement procedure. The one or more RSs may be received by the victim base station 105-*c*. The one or more RSs may include an ID associated with the aggressor base station 105-*d*. In some cases, the aggressor base station 105-*d* may transmit the one or more RSs using resources known by the victim base station 105-*c*. For example, one or more resources for CLI measurement procedures may be configured for the aggressor base station 105-*d* and the victim base station 105-*c* using backhaul coordination. In some cases, the victim base station 105-*c* may transmit the signaling 310, which may include the ID associated with aggressor base station 105-*d*. The aggressor base station 105-*d* may receive the signaling 310 and may perform one or more operations to minimize interference (e.g., restrict transmissions using one or more resources) based on receiving the signaling 310 including the ID.

A victim base station 105 may be located within a proximity of multiple other base stations 105, which may be aggressor base stations 105. The victim base station 105 may apply one or more determination rules to determine if one or more of the other base stations 105 are aggressor base stations 105. For example, a first determination rule may be based on a signal synchronization block (SSB) reference signal receive power (RSRP) being above a threshold SSB RSRP. A second determination rule may be based on an SSB RSRP being within a range (e.g., between −120 and −90 dBs). In some cases, based on the first determination rule, a victim base station 105-*c* may receive an SSB from the base station 105-*d*. The victim base station 105-*c* may determine that the RSRP of the SSB is above a threshold RSRP and accordingly determine that the base station 105-*d* is an aggressor base station 105-*d*. Accordingly, the victim base station 105-*c* may transmit signaling 310 to the aggressor base station 105-*d* based on determining that the RSRP of the SSB is above the threshold RSRP. The aggressor base station 105-*d* may receive the signaling 310 and restrict one or more transmissions on one or more DL resources based on receiving the signaling 310.

In some cases, based on the second determination rule, a victim base station 105-*c* may receive an SSB from the base station 105-*d*. The victim base station 105-*c* may determine that the RSRP of the SSB is within a range (e.g., between −120 and −90 dBs) of RSRPs and accordingly determine that the base station 105-*d* is an aggressor base station 105-*d*. The victim base station 105-*c* may transmit signaling 310 to the aggressor base station 105-*d* based on determining that the RSRP of the SSB is within the range of RSRPs. The aggressor base station 105-*d* may receive the signaling 310 and restrict one or more transmissions on one or more DL resources based on receiving the signaling 310. In some cases, the victim base station 105-*c* may determine to use the first determination rule or the second determination rule based on a specification or a standard. For example, the victim base station 105-*c* may be configured to operate according to the first determination rule, the second determination rule, or both, based on one or more network specifications or standards.

In some cases, a determination rule (e.g., one or more of the threshold RSRP and the RSRP range) may be preconfigured or received in a transmission from a base station 105. For example, the network may preconfigure the threshold RSRP, the RSRP range, or both. In some cases, the threshold RSRP, the RSRP range, or both may be based on a specification or a standard. For example, the threshold RSRP, the RSRP range, or both may be a fixed value (e.g., a value set by the network). In some other cases, a base station 105 may receive a transmission from one or more other base stations 105, which may include an indication of the threshold RSRP, the RSRP range, or both. For example, a DU or a CU of a base station 105 may transmit an indication of the threshold RSRP, the RSRP range, or both. Additionally or alternatively, a victim base station 105-*c* may transmit the indication of the threshold RSRP, the RSRP range, or both.

Figure 4:
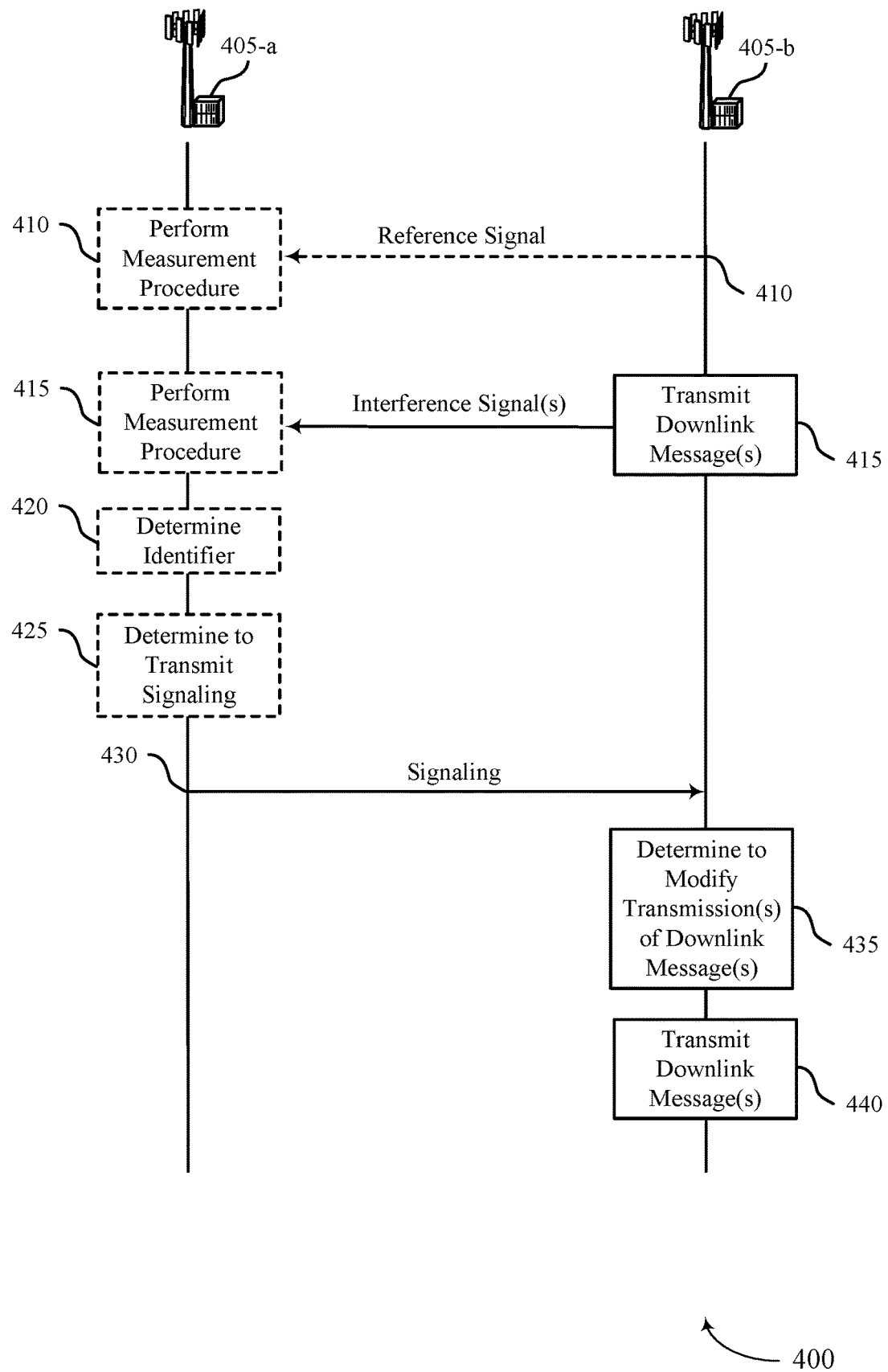
FIG. 4 illustrates an example of a process flow that supports aggressor network node determination to apply a restriction rule in accordance with aspects of the present disclosure.

FIG. 4 illustrates an example of a process flow 400 that supports aggressor network node determination to apply a restriction rule in accordance with aspects of the present disclosure. In some examples, process flow 400 may implement aspects of the wireless communications systems 100, 200, and 300. For example, process flow 400 may a first network node 405-*a* and a second network node 405-*b*, which may be examples of corresponding base stations 105 as described with reference to FIGS. 1, 2, and 3. In the following description of process flow 400, the operations between the network nodes 405 may be transmitted in a different order than the order shown, or the operations may be performed at different times.

Some operations may also be left out of process flow 400, or other operations may be added to process flow 400. While network nodes 405 are shown performing a number of the operations of process flow 400, any wireless device or network node 405 may perform the operations shown. For example, a base station 105 may perform the operations shown. Although examples described herein generally refer to network nodes 405, it is understood that base stations 105 may be examples of network nodes 405. That is, the term base station 105 and network node 405 may be used interchangeably.

At 410, the first network node 405-a may perform a measurement procedure for one or more interference signals from the second network node 405-b according to a measurement time window aligned with an RS received from the second network node 405-b. Additionally or alternatively, the first network node 405-a may receive the RS, which may be for a CLI measurement procedure. For example, the first network node 405-a, the second network node 405-b, or both may perform one or more procedures for reducing or eliminating CLI. As part of the CLI procedure, the second network node 405-b may transmit one or more RSs. The one or more RSs may be unicast, broadcast, multicast, or groupcast. In some cases, the first network node 405-a may receive one or more of the RSs transmitted by the second network node 405-b.

At 415, the first network node 405-a may perform a measurement procedure for measuring interference signals from the second network node 405-b according to a measurement time window aligned with a timing for UL signals received from the first set of wireless devices served by the first network node 405-a. Additionally or alternatively, the first network node 405-a may receive, in a first time interval, interference signals from the second network node 405-b on at least a portion of UL resources used by the first network node 405-a in the first time interval. In some cases, the second network node 405-b may transmit a first set of DL messages on DL resources to a second set of wireless devices served by the second network node 405-b. In some cases, a first set of wireless devices may be served by the first network node 405-a.

At 420, the first network node 405-a may determine an ID associated with the second network node 405-b based on the RS associated with the CLI measurement procedure. For example, the ID associated with the second network node 405-b may identify one or more parameters associated with the second network node 405-b, such as a location of the second network node 405-b. In some cases, the RS transmitted by the second network node 405-b may include the ID. The first network node 405-a may distinguish the second network node 405-b from other network nodes 405 within a proximity of the first network node 405-a based on the ID.

At 425, the first network node 405-a may determine to transmit to the second network node 405-b the indication to modify transmission on the DL resources based on identifying that SSBs received from the second network node 405-b are associated with a higher RSRP than a threshold value or the RSRP for the SSBs are within a receive power range. In some cases, an indication of the threshold value, the receive power range, or both, are transmitted by the first network node 405-a. In some cases, an indication of the threshold value, the receive power range, or both, are received from a DU or a CU in communication with the first network node 405-a. In some cases, the threshold value, the receive power range, or both are configured at the first network node 405-a.

At 430, the first network node 405-a may transmit signaling to the second network node 405-b. The signaling may include an ID for the second network node 405-b and an indication that the second network node 405-b is to modify transmission on DL resources used by the second network node 405-b to transmit to a second set of wireless devices served by the second network node 405-b. For example, the second set of wireless devices may include one or more UEs 115. In some cases, transmitting the indication that the second network node 405-b is to modify transmission on the DL resources includes transmitting to the second network node 405-b a signal configured to indicate modifying the transmission on the DL resources.

In some cases, transmitting the indication that the second network node 405-b is to modify transmission on the DL resources includes transmitting to the second network node 405-b, an indication of a set of resources on which FD cooperation is disallowed by the second network node 405-b or transmission by the second network node 405-b on DL is disallowed during one or more time periods during which the first network node 405-a is receiving on UL. In some cases, transmitting the indication that the second network node 405-b is to modify transmission on the DL resources includes transmitting to the second network node 405-b, an indication of a set of resources on which FD operation or transmission by the second network node 405-b is allowed during one or more time periods according to a transmit power backoff value.

In some cases, transmitting the indication that the second network node 405-b is to modify transmission on the DL resources includes transmitting to the second network node 405-b an indication of one or more beam configurations that the second network node 405-b is restricted from using on resources of FD operation or for transmission by the second network node 405-b on DL during one or more time periods during which the first network node 405-a is receiving on UL. In some cases, transmitting the indication that the second network node 405-b is to modify transmission on the DL resources includes transmitting to the second network node 405-b an ID of a TRP for the second network node 405-b that the second network node 405-b is restricted from using. In some cases, the ID of the TRP is for a CORESET pool index or a PCI.

At 435, the second network node 405-b may determine to modify one or more transmissions of DL messages based on receiving signaling from the first network node 405-a. For example, the signaling may include an indication to modify one or more transmissions of DL messages. Accordingly, the second network node 405-b may receive the indication and determine to modify transmissions of one or more DL messages. In some cases, one or more DL messages may be intended for one or more UEs 115.

At 440, the second network node 405-b may transmit a second set of DL messages on DL resources to the second set of wireless devices in accordance with the indication to modify transmission on the DL resources. In some cases, the second network node 405-b may modify one or more transmissions on the DL resources so that interference at the first network node 405-a is reduced or eliminated. For example, the second network node 405-b may determine not to transmit on the DL resources in a FD mode. Additionally or alternatively, the second network node 405-b may determine not to transmit on the DL resources during one or more time periods during which the first network node 405-*a* is receiving on UL. In some cases, the second network node 405-*b* may determine to back a transmit power for transmitting on the DL resources. In some cases, the second network node 405-*b* may determine not to transmit on the DL resources using a restricted beam.

Figure 5:
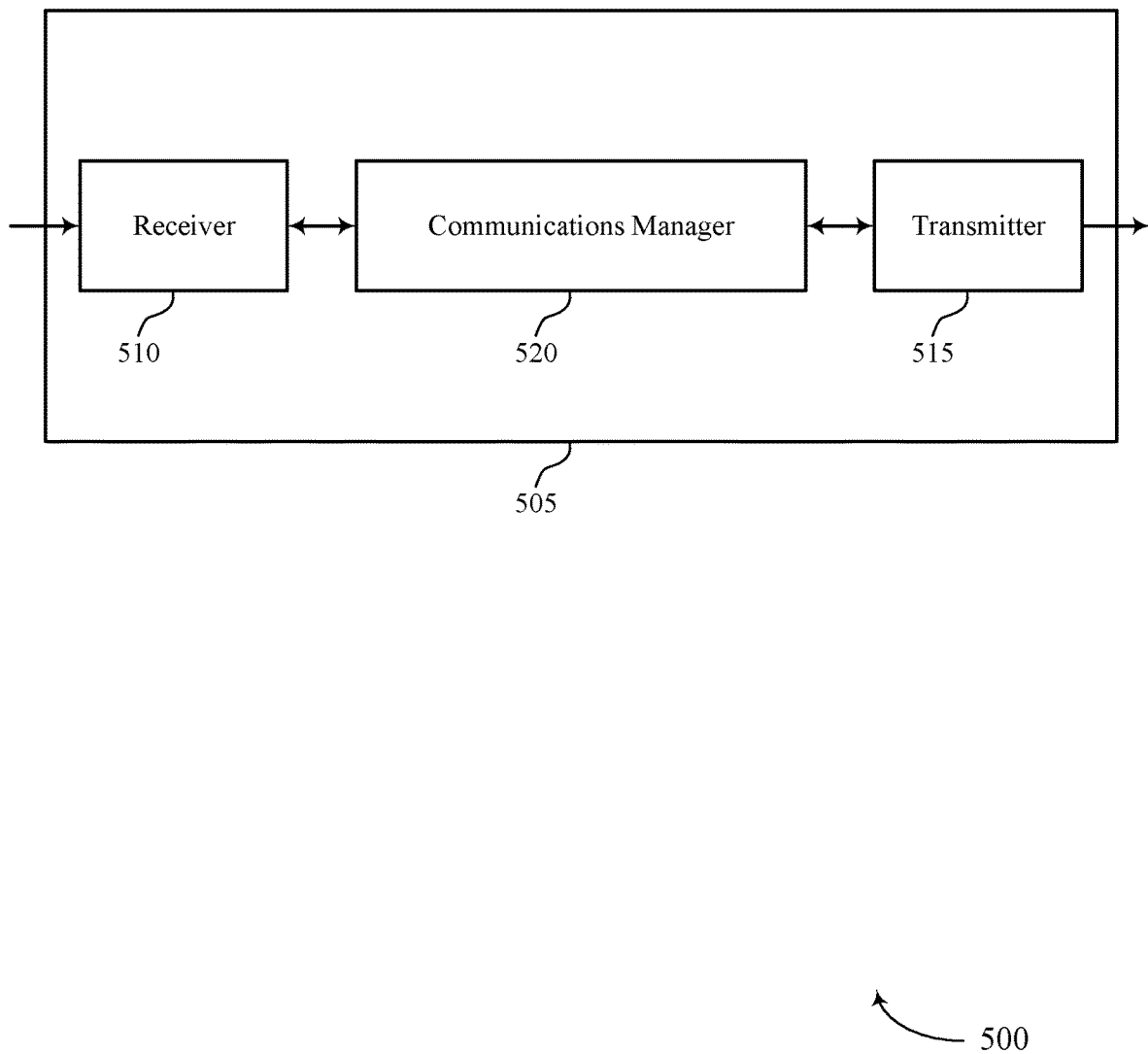
FIGS. 5 and 6 show block diagrams of devices that support aggressor network node determination to apply a restriction rule in accordance with aspects of the present disclosure.

FIG. 5 shows a block diagram 500 of a device 505 that supports aggressor network node determination to apply a restriction rule in accordance with aspects of the present disclosure. The device 505 may be an example of aspects of a base station 105 as described herein. Additionally or alternatively, the device 505 may be an example of aspects of a network node as described herein. The device 505 may include a receiver 510, a transmitter 515, and a communications manager 520. The device 505 may also include one or more processors, memory coupled with the one or more processors, and instructions stored in the memory that are executable by the one or more processors to enable the one or more processors to perform the interference mitigation features as discussed herein. Each of these components may be in communication with one another (e.g., via one or more buses).

The receiver 510 may provide a means for receiving information such as packets, user data, control information, or any combination thereof associated with various information channels (e.g., control channels, data channels, information channels related to aggressor network node determination to apply a restriction rule). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to aggressor network node determination to apply a restriction rule). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of aggressor network node determination to apply a restriction rule as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a first network node in accordance with examples as disclosed herein. For example, the communications manager 520 may be configured as or otherwise support a means for receiving, in a first time interval, interference signals from a second network node on at least a portion of uplink resources used by the first network node to receive from a first set of wireless devices served by the first network node in the first time interval. The communications manager 520 may be configured as or otherwise support a means for transmitting, to the second network node, an identifier associated with the second network node and an indication that the second network node is to modify transmission on downlink resources used by the second network node to transmit to a second set of wireless devices served by the second network node.

Additionally or alternatively, the communications manager 520 may support wireless communication at a second network node in accordance with examples as disclosed herein. For example, the communications manager 520 may be configured as or otherwise support a means for transmitting a first set of downlink messages on downlink resources to a second set of wireless devices served by the second network node, a first set of wireless devices served by a first network node. The communications manager 520 may be configured as or otherwise support a means for receiving, from the first network node, an identifier of the second network node and an indication that the second network node is to modify transmission on the downlink resources. The communications manager 520 may be configured as or otherwise support a means for transmitting a second set of downlink messages on the downlink resources to the second set of wireless devices in accordance with the indication to modify transmission on the downlink resources.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for more efficient utilization of communication resources and improved coordination between devices. For example, the device 505 may support OTA communications between base stations 105, which may improve coordination and reduce interference between base stations 105. The techniques for reduced interference may allow the device 505 to reduce the processing overhead at the device 505 and more efficiently communicate with other wireless devices.

Figure 6:
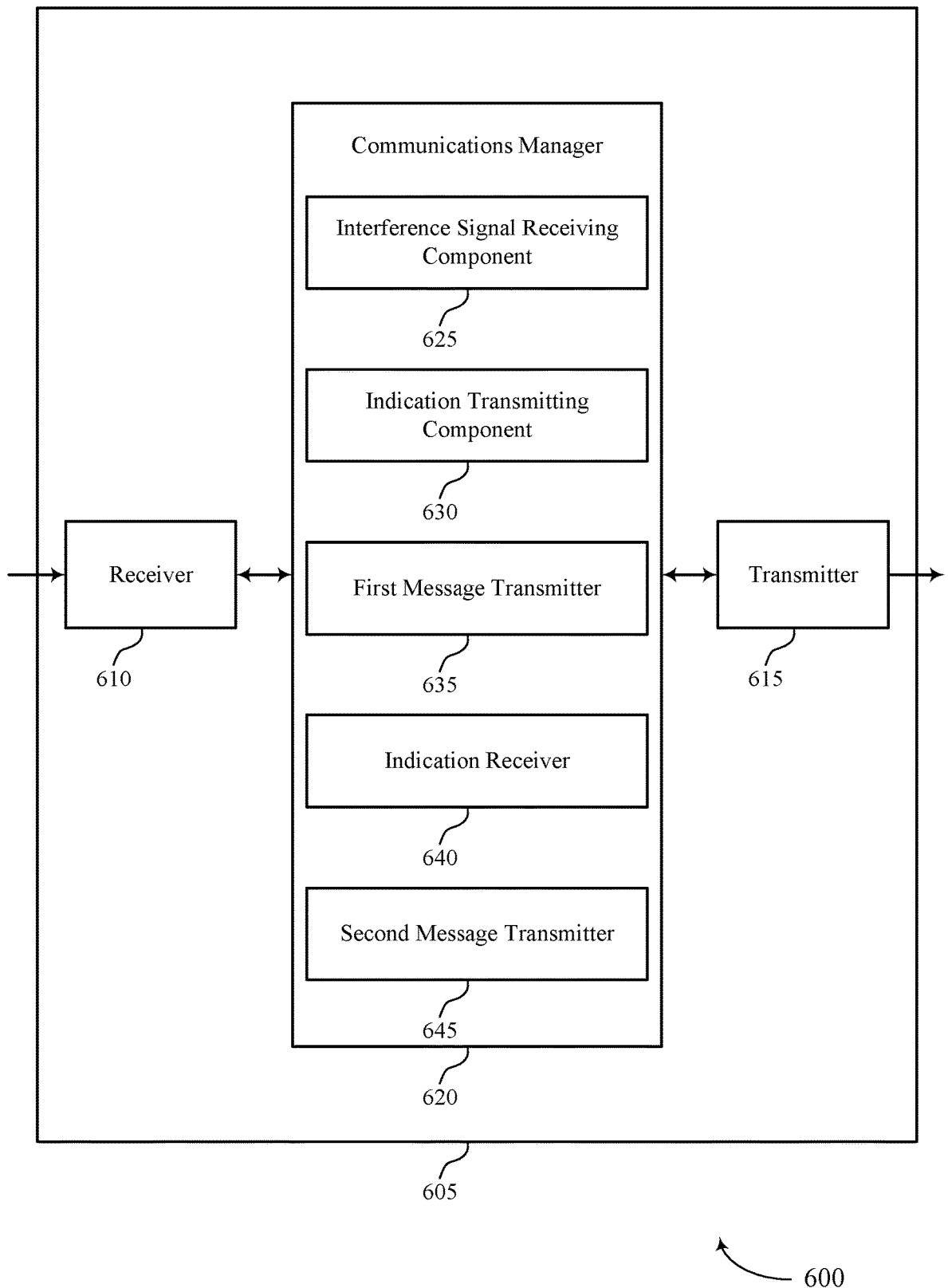

FIG. 6 shows a block diagram 600 of a device 605 that supports aggressor network node determination to apply a restriction rule in accordance with aspects of the present disclosure. The device 605 may be an example of aspects of a device 505 or a base station 105 as described herein. Additionally or alternatively, the device 605 may be an example of aspects of a network node as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to aggressor network node determination to apply a restriction rule). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to aggressor network node determination to apply a restriction rule). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of aggressor network node determination to apply a restriction rule as described herein. For example, the communications manager 620 may include an interference signal receiving component 625, an indication transmitting component 630, a first message transmitter 635, an indication receiver 640, a second message transmitter 645, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a first network node in accordance with examples as disclosed herein. The interference signal receiving component 625 may be configured as or otherwise support a means for receiving, in a first time interval, interference signals from a second network node on at least a portion of uplink resources used by the first network node to receive from a first set of wireless devices served by the first network node in the first time interval. The indication transmitting component 630 may be configured as or otherwise support a means for transmitting, to the second network node, an identifier associated with the second network node and an indication that the second network node is to modify transmission on downlink resources used by the second network node to transmit to a second set of wireless devices served by the second network node.

Additionally or alternatively, the communications manager 620 may support wireless communication at a second network node in accordance with examples as disclosed herein. The first message transmitter 635 may be configured as or otherwise support a means for transmitting a first set of downlink messages on downlink resources to a second set of wireless devices served by the second network node, a first set of wireless devices served by a first network node. The indication receiver 640 may be configured as or otherwise support a means for receiving, from the first network node, an identifier of the second network node and an indication that the second network node is to modify transmission on the downlink resources. The second message transmitter 645 may be configured as or otherwise support a means for transmitting a second set of downlink messages on the downlink resources to the second set of wireless devices in accordance with the indication to modify transmission on the downlink resources.

In some cases, the interference signal receiving component 625, indication transmitting component 630, first message transmitter 635, indication receiver 640, and second message transmitter 645, may each be or be at least a part of a processor (e.g., a transceiver processor, or a radio processor or a transmitter processor, or a receiver processor). The processor may be coupled with memory and execute instructions stored in the memory that enable the processor to perform or facilitate the features of the interference signal receiving component 625, indication transmitting component 630, first message transmitter 635, indication receiver 640, and second message transmitter 645 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 7:
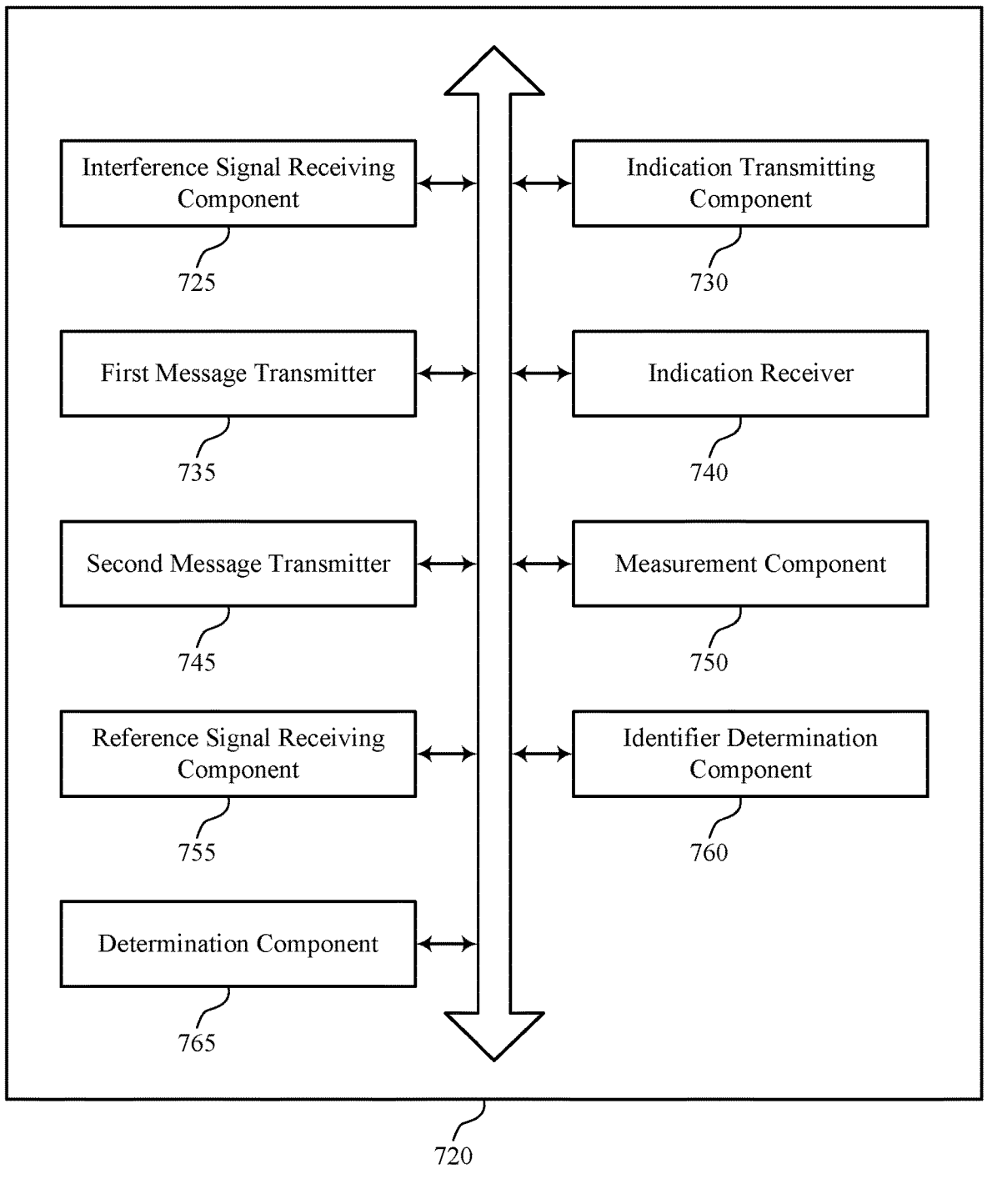
FIG. 7 shows a block diagram of a communications manager that supports aggressor network node determination to apply a restriction rule in accordance with aspects of the present disclosure.

FIG. 7 shows a block diagram 700 of a communications manager 720 that supports aggressor network node determination to apply a restriction rule in accordance with aspects of the present disclosure. The communications manager 720 may be an example of aspects of a communications manager 520, a communications manager 620, or both, as described herein. The communications manager 720, or various components thereof, may be an example of means for performing various aspects of aggressor network node determination to apply a restriction rule as described herein. For example, the communications manager 720 may include an interference signal receiving component 725, an indication transmitting component 730, a first message transmitter 735, an indication receiver 740, a second message transmitter 745, a measurement component 750, a reference signal receiving component 755, an identifier determination component 760, a determination component 765, or any combination thereof. Each of these components may communicate, directly or indirectly, with one another (e.g., via one or more buses).

The communications manager 720 may support wireless communication at a first network node in accordance with examples as disclosed herein. The interference signal receiving component 725 may be configured as or otherwise support a means for receiving, in a first time interval, interference signals from a second network node on at least a portion of uplink resources used by the first network node to receive from a first set of wireless devices served by the first network node in the first time interval. The indication transmitting component 730 may be configured as or otherwise support a means for transmitting, to the second network node, an identifier associated with the second network node and an indication that the second network node is to modify transmission on downlink resources used by the second network node to transmit to a second set of wireless devices served by the second network node.

In some examples, to support transmitting the indication that the second network node is to modify transmission on the downlink resources, the indication transmitting component 730 may be configured as or otherwise support a means for transmitting, to the second network node, a signal configured to indicate modifying the transmission on the downlink resources.

In some examples, to support transmitting the indication that the second network node is to modify transmission on the downlink resources, the indication transmitting component 730 may be configured as or otherwise support a means for transmitting, to the second network node, an indication of a set of resources on which full duplex operation is disallowed by the second network node or transmission by the second network node on downlink is disallowed during one or more time periods during which the first network node is receiving on uplink.

In some examples, to support transmitting the indication that the second network node is to modify transmission on the downlink resources, the indication transmitting component 730 may be configured as or otherwise support a means for transmitting, to the second network node, an indication of a set of resources on which full duplex operation or transmission by the second network node is allowed during one or more time periods according to a transmit power backoff value.

In some examples, to support transmitting the indication that the second network node is to modify transmission on the downlink resources, the indication transmitting component 730 may be configured as or otherwise support a means for transmitting, to the second network node, an indication of one or more beam configurations that the second network node is restricted from using on resources of full duplex operation or for transmission by the second network node on downlink during one or more time periods during which the first network node is receiving on uplink.

In some examples, the measurement component 750 may be configured as or otherwise support a means for performing a measurement procedure for the interference signals from the second network node according to a measurement time window aligned with a reference signal received from the second network node.

In some examples, the measurement component 750 may be configured as or otherwise support a means for performing a measurement procedure for the interference signals from the second network node according to a measurement time window aligned with a timing for uplink signals received from the first set of wireless devices served by the first network node.

In some examples, the reference signal receiving component 755 may be configured as or otherwise support a means for receiving a reference signal associated with a cross-link interference measurement procedure. In some examples, the identifier determination component 760 may be configured as or otherwise support a means for determining the identifier associated with the second network node based on the reference signal associated with the cross-link interference measurement procedure.

In some examples, to support transmitting the indication that the second network node is to modify transmission on the downlink resources, the indication transmitting component 730 may be configured as or otherwise support a means for transmitting, to the second network node, an identifier of a transmission reception point associated with the second network node that the second network node is restricted from using.

In some examples, the identifier of the transmission reception point is associated with a control resource set pool index or a physical cell identifier.

In some examples, the determination component 765 may be configured as or otherwise support a means for determining to transmit to the second network node the indication to modify transmission on the downlink resources based on identifying that synchronization signal blocks received from the second network node are associated with a higher reference signal received power (RSRP) than a threshold value or the RSRP for the synchronization signal blocks are within a receive power range.

In some examples, an indication of the threshold value, the receive power range, or both, are transmitted by the first network node. In some examples, an indication of the threshold value, the receive power range, or both, are received from a distributed unit or a central unit in communication with the first network node. In some examples, the threshold value, the receive power range, or both are configured at the first network node.

Additionally or alternatively, the communications manager 720 may support wireless communication at a second network node in accordance with examples as disclosed herein. The first message transmitter 735 may be configured as or otherwise support a means for transmitting a first set of downlink messages on downlink resources to a second set of wireless devices served by the second network node, a first set of wireless devices served by a first network node. The indication receiver 740 may be configured as or otherwise support a means for receiving, from the first network node, an identifier of the second network node and an indication that the second network node is to modify transmission on the downlink resources. The second message transmitter 745 may be configured as or otherwise support a means for transmitting a second set of downlink messages on the downlink resources to the second set of wireless devices in accordance with the indication to modify transmission on the downlink resources.

In some examples, to support receiving the indication that the second network node is to modify transmission on the downlink resources, the indication receiver 740 may be configured as or otherwise support a means for receiving, from the first network node, a reference signal configured to indicate modifying the transmission on the downlink resources.

In some examples, to support receiving the indication that the second network node is to modify transmission on the downlink resources, the indication receiver 740 may be configured as or otherwise support a means for receiving, from the first network node, an indication of a set of resources on which full duplex operation is disallowed by the second network node or transmission by the second network node on downlink is disallowed during one or more time periods during which the first network node is receiving on uplink.

In some examples, to support receiving the indication that the second network node is to modify transmission on the downlink resources, the indication receiver 740 may be configured as or otherwise support a means for receiving, from the first network node, an indication of a set of resources on which full duplex operation or transmission by the second network node is allowed during one or more time periods according to a transmit power backoff value.

In some examples, to support receiving the indication that the second network node is to modify transmission on the downlink resources, the indication receiver 740 may be configured as or otherwise support a means for receiving, from the first network node, an indication of one or more beam configurations that the second network node is restricted from using on resources of full duplex operation or for transmission by the second network node on downlink during one or more time periods during which the first network node is receiving on uplink.

In some examples, to support receiving the indication that the second network node is to modify transmission on the downlink resources, the indication receiver 740 may be configured as or otherwise support a means for receiving, from the first network node, an identifier of a transmission reception point associated with the second network node that the second network node is restricted from using.

In some cases, an interference signal receiving component 725, an indication transmitting component 730, a first message transmitter 735, an indication receiver 740, a second message transmitter 745, a measurement component 750, a reference signal receiving component 755, an identifier determination component 760, and a determination component 765 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of an interference signal receiving component 725, an indication transmitting component 730, a first message transmitter 735, an indication receiver 740, a second message transmitter 745, a measurement component 750, a reference signal receiving component 755, an identifier determination component 760, and a determination component 765 discussed herein.

Figure 8:
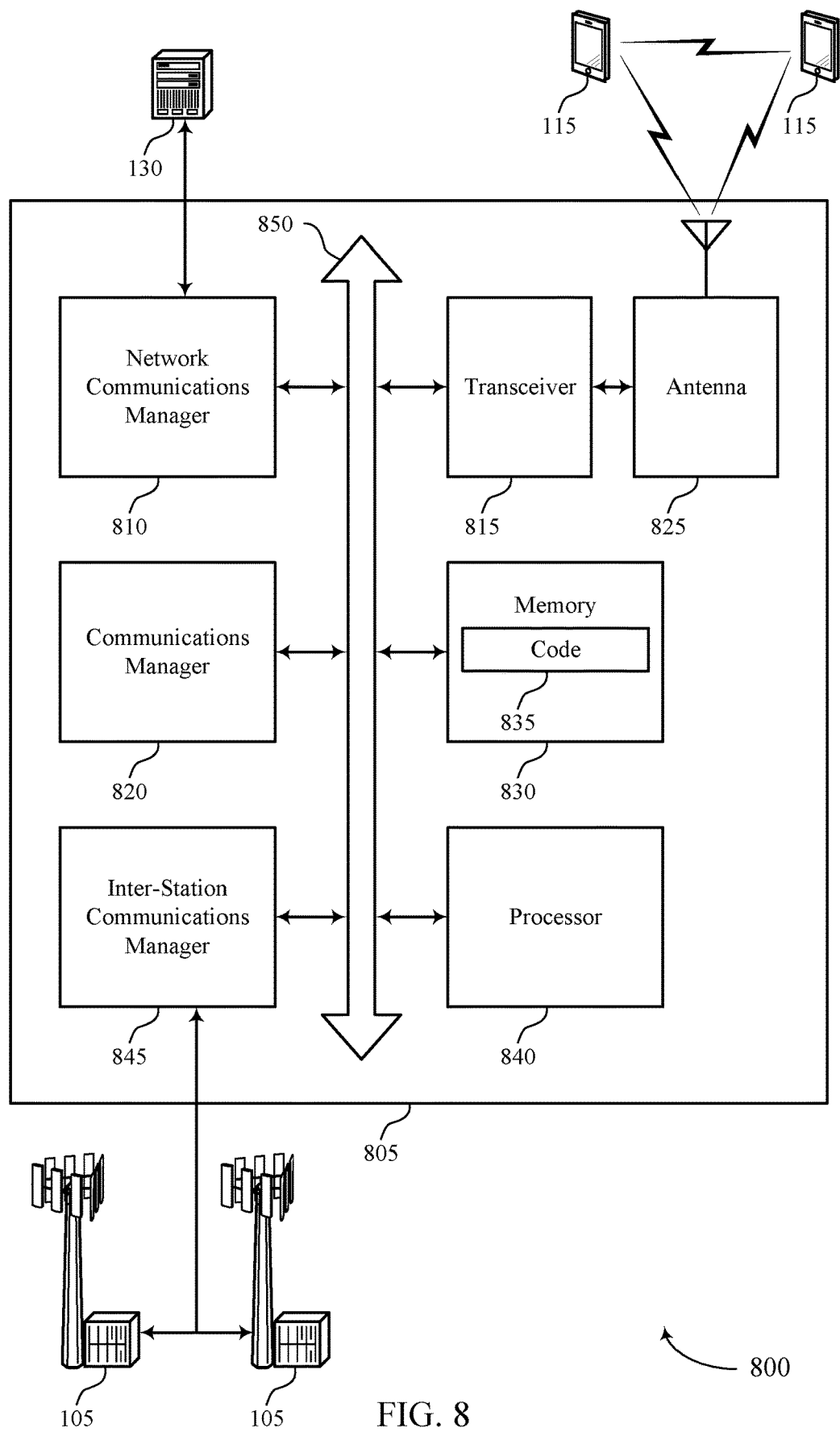
FIG. 8 shows a diagram of a system including a device that supports aggressor network node determination to apply a restriction rule in accordance with aspects of the present disclosure.

FIG. 8 shows a diagram of a system 800 including a device 805 that supports aggressor network node determination to apply a restriction rule in accordance with aspects of the present disclosure. The device 805 may be an example of or include the components of a device 505, a device 605, a network node, or a base station 105 as described herein. The device 805 may communicate wirelessly with one or more base stations 105, UEs 115, network nodes, or any combination thereof. The device 805 may include components for bi-directional voice and data communications including components for transmitting and receiving communications, such as a communications manager 820, a network communications manager 810, a transceiver 815, an antenna 825, a memory 830, code 835, a processor 840, and an inter-station communications manager 845. These components may be in electronic communication or otherwise coupled (e.g., operatively, communicatively, functionally, electronically, electrically) via one or more buses (e.g., a bus 850).

The network communications manager 810 may manage communications with a core network 130 (e.g., via one or more wired backhaul links). For example, the network communications manager 810 may manage the transfer of data communications for client devices, such as one or more UEs 115.

In some cases, the device 805 may include a single antenna 825. However, in some other cases the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include RAM and ROM. The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a BIOS which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting aggressor network node determination to apply a restriction rule). For example, the device 805 or a component of the device 805 may include a processor 840 and memory 830 coupled to the processor 840, the processor 840 and memory 830 configured to perform various functions described herein.

The inter-station communications manager 845 may manage communications with other base stations 105 or network nodes, and may include a controller or scheduler for controlling communications with UEs 115 in cooperation with other base stations 105 or network nodes. For example, the inter-station communications manager 845 may coordinate scheduling for transmissions to UEs 115 for various interference mitigation techniques such as beamforming or joint transmission. In some examples, the inter-station communications manager 845 may provide an X2 interface within an LTE/LTE-A wireless communications network technology to provide communication between base stations 105 or network nodes.

The communications manager 820 may support wireless communication at a first network node in accordance with examples as disclosed herein. For example, the communications manager 820 may be configured as or otherwise support a means for receiving, in a first time interval, interference signals from a second network node on at least a portion of uplink resources used by the first network node to receive from a first set of wireless devices served by the first network node in the first time interval. The communications manager 820 may be configured as or otherwise support a means for transmitting, to the second network node, an identifier associated with the second network node and an indication that the second network node is to modify transmission on downlink resources used by the second network node to transmit to a second set of wireless devices served by the second network node.

Additionally or alternatively, the communications manager 820 may support wireless communication at a second network node in accordance with examples as disclosed herein. For example, the communications manager 820 may be configured as or otherwise support a means for transmitting a first set of downlink messages on downlink resources to a second set of wireless devices served by the second network node, a first set of wireless devices served by a first network node. The communications manager 820 may be configured as or otherwise support a means for receiving, from the first network node, an identifier of the second network node and an indication that the second network node is to modify transmission on the downlink resources. The communications manager 820 may be configured as or otherwise support a means for transmitting a second set of downlink messages on the downlink resources to the second set of wireless devices in accordance with the indication to modify transmission on the downlink resources.

By including or configuring the communications manager 820 in accordance with examples as described herein, the device 805 may support techniques for improved communication reliability and improved coordination between devices. For example, the device 805 may support OTA signaling between base stations, which may reduce latency associated with backhaul communications. In some cases, the device 805 may support control signaling techniques, which may improve coordination and reduce interference between base stations 105. The techniques for reduced interference may allow the device 805 to reduce the processing overhead at the device 805 and more efficiently communicate with other wireless devices.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of aggressor network node determination to apply a restriction rule as described herein, or the processor 840 and the memory 830 may be otherwise configured to perform or support such operations.

Figure 9:
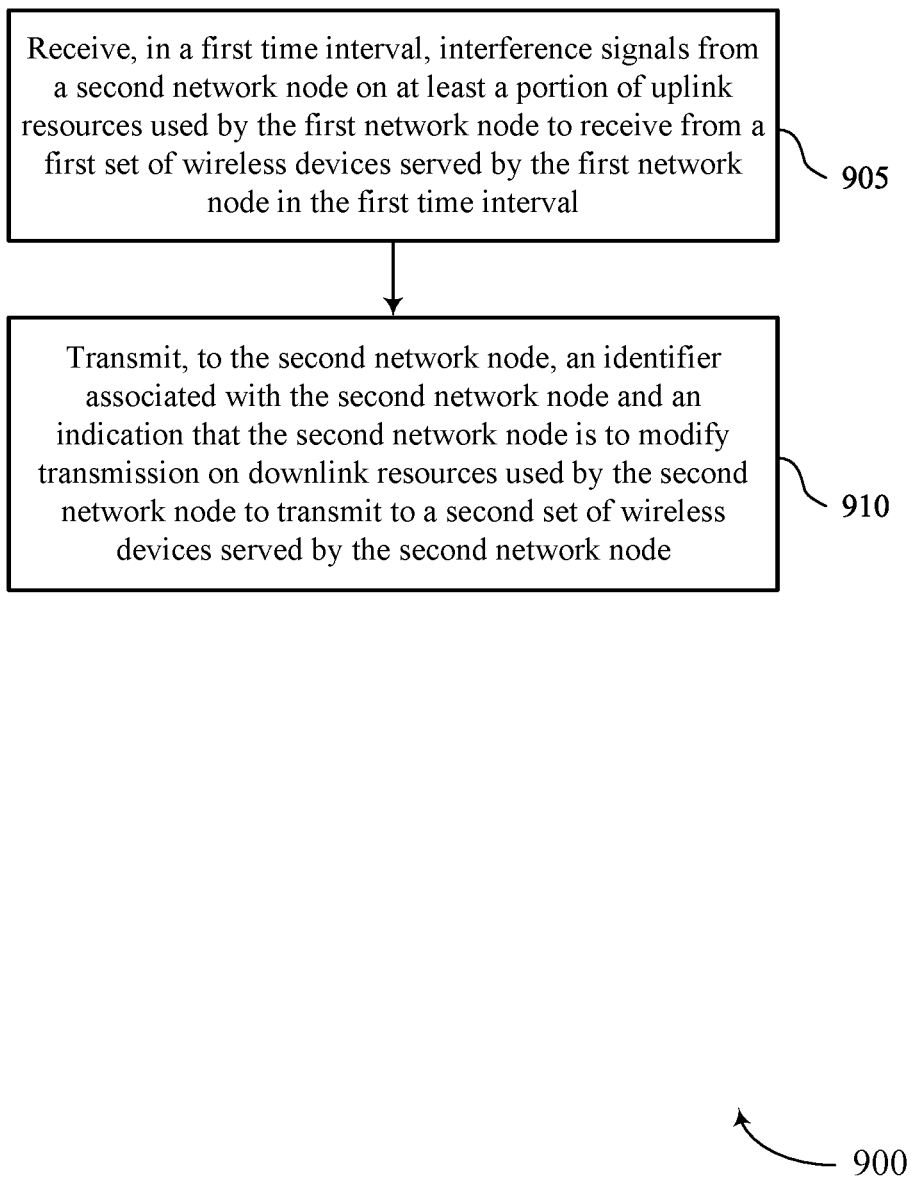
FIGS. 9 through 12 show flowcharts illustrating methods that support aggressor network node determination to apply a restriction rule in accordance with aspects of the present disclosure.

FIG. 9 shows a flowchart illustrating a method 900 that supports aggressor network node determination to apply a restriction rule in accordance with aspects of the present disclosure. The operations of the method 900 may be implemented by a base station or its components as described herein. For example, the operations of the method 900 may be performed by a base station 105 as described with reference to FIGS. 1 through 8. Additionally or alternatively, the operations of the method 900 may be implemented by a network node or its components as described herein. In some examples, a base station or a network node may execute a set of instructions to control the functional elements of the base station or the network node to perform the described functions. Additionally or alternatively, the base station or the network node may perform aspects of the described functions using special-purpose hardware.

At 905, the method may include receiving, in a first time interval, interference signals from a second network node on at least a portion of uplink resources used by the first network node to receive from a first set of wireless devices served by the first network node in the first time interval. The operations of 905 may be performed in accordance with examples as disclosed herein. In some examples, aspects of the operations of 905 may be performed by an interference signal receiving component 725 as described with reference to FIG. 7.

At 910, the method may include transmitting, to the second network node, an identifier associated with the second network node and an indication that the second network node is to modify transmission on downlink resources used by the second network node to transmit to a second set of wireless devices served by the second network node. The operations of 910 may be performed in accordance with examples as disclosed herein. In some examples, aspects of the operations of 910 may be performed by an indication transmitting component 730 as described with reference to FIG. 7.

Figure 10:
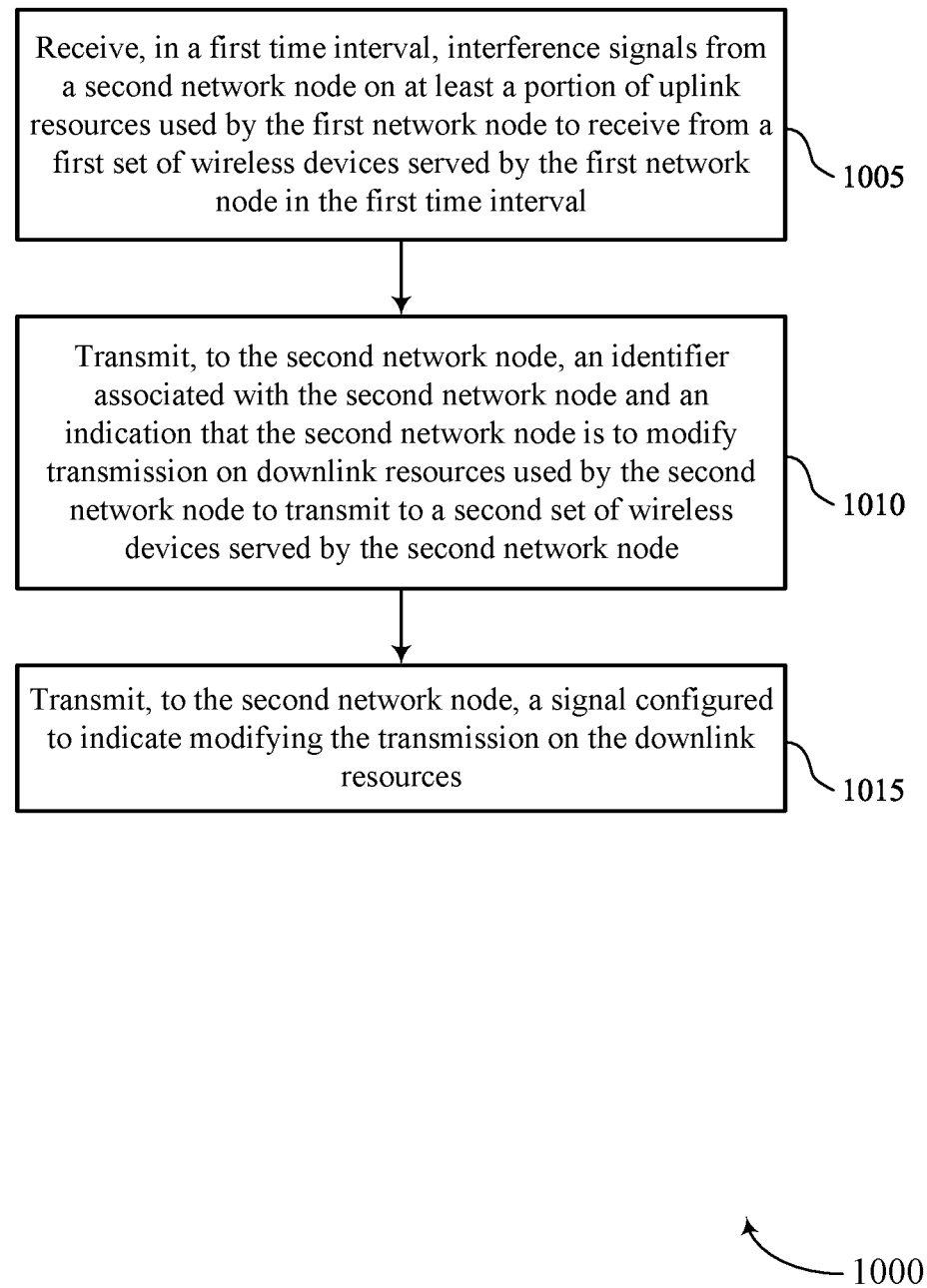

FIG. 10 shows a flowchart illustrating a method 1000 that supports aggressor network node determination to apply a restriction rule in accordance with aspects of the present disclosure. The operations of the method 1000 may be implemented by a base station or its components as described herein. For example, the operations of the method 1000 may be performed by a base station 105 as described with reference to FIGS. 1 through 8. Additionally or alternatively, the operations of the method 1000 may be implemented by a network node or its components as described herein. In some examples, a base station or a network node may execute a set of instructions to control the functional elements of the base station or the network node to perform the described functions. Additionally or alternatively, the base station or the network node may perform aspects of the described functions using special-purpose hardware.

At 1005, the method may include receiving, in a first time interval, interference signals from a second network node on at least a portion of uplink resources used by the first network node to receive from a first set of wireless devices served by the first network node in the first time interval. The operations of 1005 may be performed in accordance with examples as disclosed herein. In some examples, aspects of the operations of 1005 may be performed by an interference signal receiving component 725 as described with reference to FIG. 7.

At 1010, the method may include transmitting, to the second network node, an identifier associated with the second network node and an indication that the second network node is to modify transmission on downlink resources used by the second network node to transmit to a second set of wireless devices served by the second network node. The operations of 1010 may be performed in accordance with examples as disclosed herein. In some examples, aspects of the operations of 1010 may be performed by an indication transmitting component 730 as described with reference to FIG. 7.

At 1015, the method may include transmitting, to the second network node, a signal configured to indicate modifying the transmission on the downlink resources. The operations of 1015 may be performed in accordance with examples as disclosed herein. In some examples, aspects of the operations of 1015 may be performed by an indication transmitting component 730 as described with reference to FIG. 7.

Figure 11:
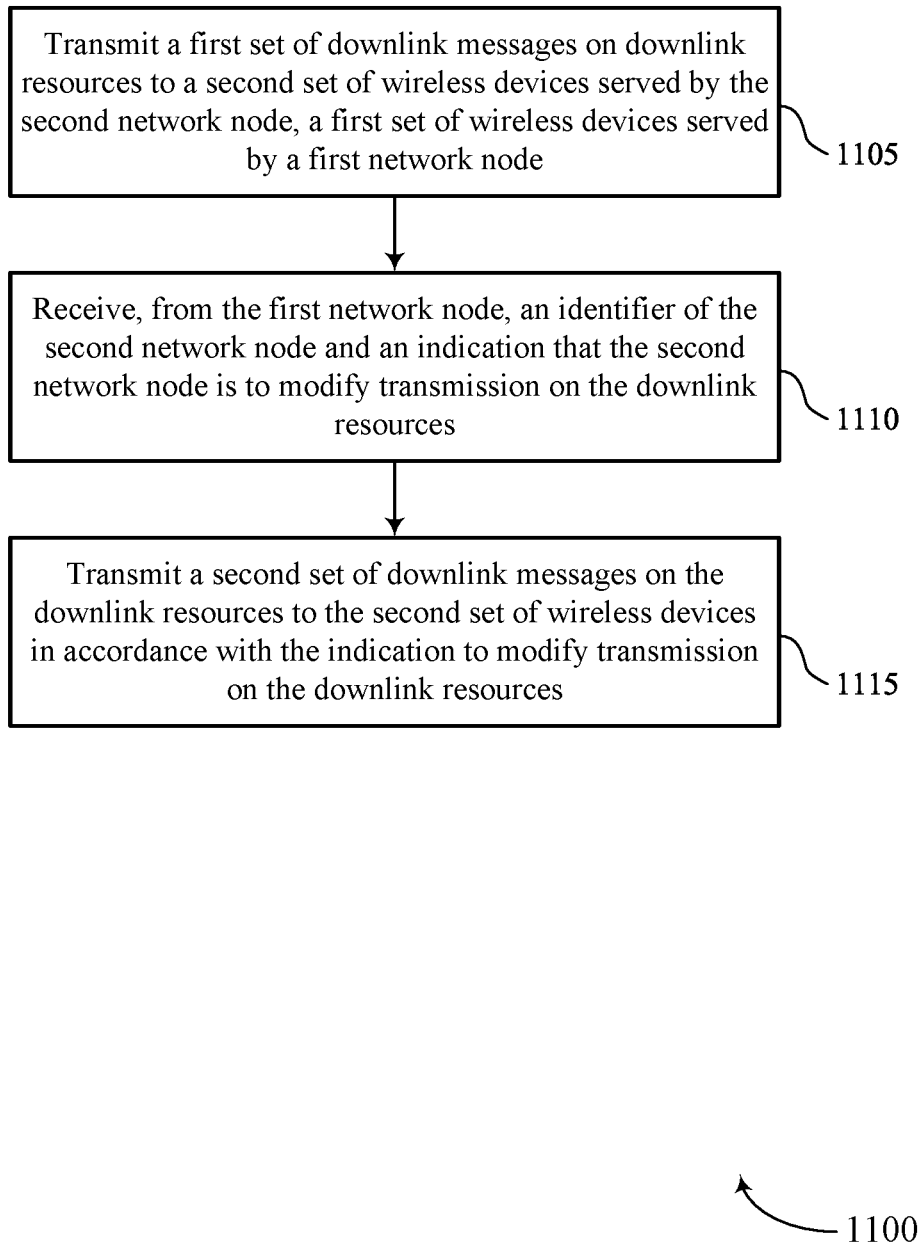

FIG. 11 shows a flowchart illustrating a method 1100 that supports aggressor network node determination to apply a restriction rule in accordance with aspects of the present disclosure. The operations of the method 1100 may be implemented by a base station or its components as described herein. For example, the operations of the method 1100 may be performed by a base station 105 as described with reference to FIGS. 1 through 8. Additionally or alternatively, the operations of the method 1100 may be implemented by a network node or its components as described herein. In some examples, a base station or a network node may execute a set of instructions to control the functional elements of the base station or the network node to perform the described functions. Additionally or alternatively, the base station or the network node may perform aspects of the described functions using special-purpose hardware.

At 1105, the method may include transmitting a first set of downlink messages on downlink resources to a second set of wireless devices served by the second network node, a first set of wireless devices served by a first network node. The operations of 1105 may be performed in accordance with examples as disclosed herein. In some examples, aspects of the operations of 1105 may be performed by a first message transmitter 735 as described with reference to FIG. 7.

At 1110, the method may include receiving, from the first network node, an identifier of the second network node and an indication that the second network node is to modify transmission on the downlink resources. The operations of 1110 may be performed in accordance with examples as disclosed herein. In some examples, aspects of the operations of 1110 may be performed by an indication receiver 740 as described with reference to FIG. 7.

At 1115, the method may include transmitting a second set of downlink messages on the downlink resources to the second set of wireless devices in accordance with the indication to modify transmission on the downlink resources. The operations of 1115 may be performed in accordance with examples as disclosed herein. In some examples, aspects of the operations of 1115 may be performed by a second message transmitter 745 as described with reference to FIG. 7.

Figure 12:
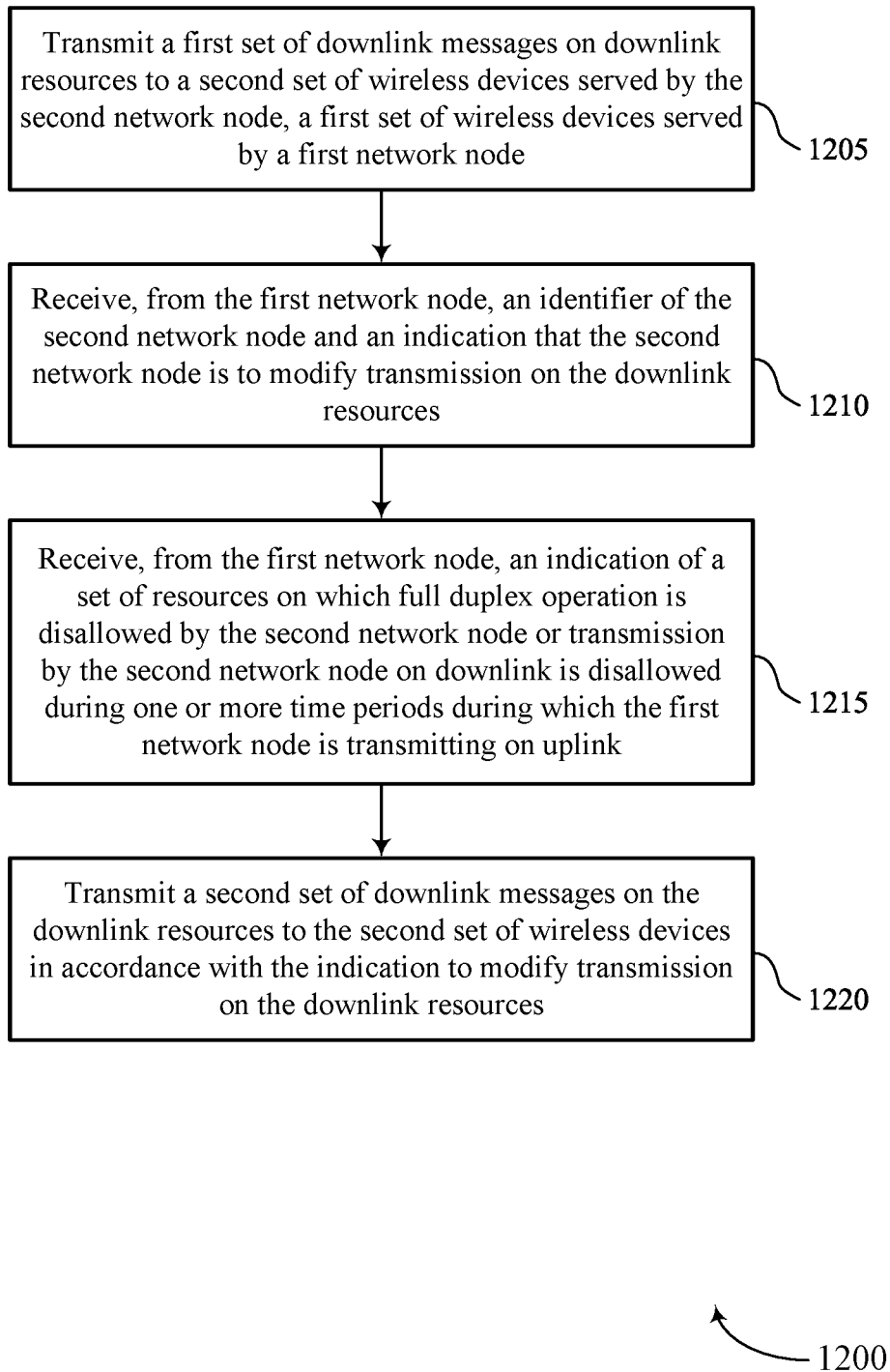

FIG. 12 shows a flowchart illustrating a method 1200 that supports aggressor network node determination to apply a restriction rule in accordance with aspects of the present disclosure. The operations of the method 1200 may be implemented by a base station or its components as described herein. For example, the operations of the method 1200 may be performed by a base station 105 as described with reference to FIGS. 1 through 8. Additionally or alternatively, the operations of the method 1200 may be implemented by a network node or its components as described herein. In some examples, a base station or network node may execute a set of instructions to control the functional elements of the base station or network node to perform the described functions. Additionally or alternatively, the base station or network node may perform aspects of the described functions using special-purpose hardware.

At 1205, the method may include transmitting a first set of downlink messages on downlink resources to a second set of wireless devices served by the second network node, a first set of wireless devices served by a first network node. The operations of 1205 may be performed in accordance with examples as disclosed herein. In some examples, aspects of the operations of 1205 may be performed by a first message transmitter 735 as described with reference to FIG. 7.

At 1210, the method may include receiving, from the first network node, an identifier of the second network node and an indication that the second network node is to modify transmission on the downlink resources. The operations of 1210 may be performed in accordance with examples as disclosed herein. In some examples, aspects of the operations of 1210 may be performed by an indication receiver 740 as described with reference to FIG. 7.

At 1215, the method may include receiving, from the first network node, an indication of a set of resources on which full duplex operation is disallowed by the second network node or transmission by the second network node on downlink is disallowed during one or more time periods during which the first network node is receiving on uplink. The operations of 1215 may be performed in accordance with examples as disclosed herein. In some examples, aspects of the operations of 1215 may be performed by an indication receiver 740 as described with reference to FIG. 7.

At 1220, the method may include transmitting a second set of downlink messages on the downlink resources to the second set of wireless devices in accordance with the indication to modify transmission on the downlink resources. The operations of 1220 may be performed in accordance with examples as disclosed herein. In some examples, aspects of the operations of 1220 may be performed by a second message transmitter 745 as described with reference to FIG. 7.

The following provides an overview of aspects of the present disclosure:

Aspect 1: A method for wireless communication at a first network node, comprising: receiving, in a first time interval, interference signals from a second network node on at least a portion of uplink resources used by the first network node to receive from a first set of wireless devices served by the first network node in the first time interval; and transmitting, to the second network node, an identifier associated with the second network node and an indication that the second network node is to modify transmission on downlink resources used by the second network node to transmit to a second set of wireless devices served by the second network node.

Aspect 2: The method of aspect 1, wherein transmitting the indication that the second network node is to modify transmission on the downlink resources comprises: transmitting, to the second network node, a signal configured to indicate modifying the transmission on the downlink resources.

Aspect 3: The method of any of aspects 1 through 2, wherein transmitting the indication that the second network node is to modify transmission on the downlink resources comprises: transmitting, to the second network node, an indication of a set of resources on which full duplex operation is disallowed by the second network node or transmission by the second network node on downlink is disallowed during one or more time periods during which the first network node is receiving on uplink.

Aspect 4: The method of any of aspects 1 through 2, wherein transmitting the indication that the second network node is to modify transmission on the downlink resources comprises: transmitting, to the second network node, an indication of a set of resources on which full duplex operation or transmission by the second network node is allowed during one or more time periods according to a transmit power backoff value.

Aspect 5: The method of any of aspects 1 through 2, wherein transmitting the indication that the second network node is to modify transmission on the downlink resources comprises: transmitting, to the second network node, an indication of one or more beam configurations that the second network node is restricted from using on resources of full duplex operation or for transmission by the second network node on downlink during one or more time periods during which the first network node is receiving on uplink.

Aspect 6: The method of any of aspects 1 through 5, further comprising: performing a measurement procedure for the interference signals from the second network node according to a measurement time window aligned with a reference signal received from the second network node.

Aspect 7: The method of any of aspects 1 through 5, further comprising: performing a measurement procedure for the interference signals from the second network node according to a measurement time window aligned with a timing for uplink signals received from the first set of wireless devices served by the first network node.

Aspect 8: The method of any of aspects 1 through 7, further comprising: receiving a reference signal associated with a cross-link interference measurement procedure; and determining the identifier associated with the second network node based at least in part on the reference signal associated with the cross-link interference measurement procedure.

Aspect 9: The method of any of aspects 1 through 2, wherein transmitting the indication that the second network node is to modify transmission on the downlink resources comprises: transmitting, to the second network node, an identifier of a transmission reception point associated with the second network node that the second network node is restricted from using.

Aspect 10: The method of aspect 9, wherein the identifier of the transmission reception point is associated with a control resource set pool index or a physical cell identifier.

Aspect 11: The method of any of aspects 1 through 10, further comprising: determining to transmit to the second network node the indication to modify transmission on the downlink resources based at least in part on identifying that synchronization signal blocks received from the second network node are associated with a higher reference signal received power (RSRP) than a threshold value or the RSRP for the synchronization signal blocks are within a receive power range.

Aspect 12: The method of aspect 11, wherein an indication of the threshold value, the receive power range, or both, are transmitted by the first network node; an indication of the threshold value, the receive power range, or both, are received from a distributed unit or a central unit in communication with the first network node; or the threshold value, the receive power range, or both are configured at the first network node.

Aspect 13: A method for wireless communication at a second network node, comprising: transmitting a first set of downlink messages on downlink resources to a second set of wireless devices served by the second network node, a first set of wireless devices served by a first network node; receiving, from the first network node, an identifier of the second network node and an indication that the second network node is to modify transmission on the downlink resources; and transmitting a second set of downlink messages on the downlink resources to the second set of wireless devices in accordance with the indication to modify transmission on the downlink resources.

Aspect 14: The method of aspect 13, wherein receiving the indication that the second network node is to modify transmission on the downlink resources comprises: receiving, from the first network node, a reference signal configured to indicate modifying the transmission on the downlink resources.

Aspect 15: The method of any of aspects 13 through 14, wherein receiving the indication that the second network node is to modify transmission on the downlink resources comprises: receiving, from the first network node, an indication of a set of resources on which full duplex operation is disallowed by the second network node or transmission by the second network node on downlink is disallowed during one or more time periods during which the first network node is receiving on uplink.

Aspect 16: The method of any of aspects 13 through 14, wherein receiving the indication that the second network node is to modify transmission on the downlink resources comprises: receiving, from the first network node, an indication of a set of resources on which full duplex operation or transmission by the second network node is allowed during one or more time periods according to a transmit power backoff value.

Aspect 17: The method of any of aspects 13 through 14, wherein receiving the indication that the second network node is to modify transmission on the downlink resources comprises: receiving, from the first network node, an indication of one or more beam configurations that the second network node is restricted from using on resources of full duplex operation or for transmission by the second network node on downlink during one or more time periods during which the first network node is receiving on uplink.

Aspect 18: The method of any of aspects 13 through 14, wherein receiving the indication that the second network node is to modify transmission on the downlink resources comprises: receiving, from the first network node, an identifier of a transmission reception point associated with the second network node that the second network node is restricted from using.

Aspect 19: An apparatus for wireless communication at a first network node, comprising a processor; memory coupled with the processor; and instructions stored in the memory and executable by the processor to cause the apparatus to perform a method of any of aspects 1 through 12.

Aspect 20: An apparatus for wireless communication at a first network node, comprising at least one means for performing a method of any of aspects 1 through 12.

Aspect 21: A non-transitory computer-readable medium storing code for wireless communication at a first network node, the code comprising instructions executable by a processor to perform a method of any of aspects 1 through 12.

Aspect 22: An apparatus for wireless communication at a second network node, comprising a processor; memory coupled with the processor; and instructions stored in the memory and executable by the processor to cause the apparatus to perform a method of any of aspects 13 through 18.

Aspect 23: An apparatus for wireless communication at a second network node, comprising at least one means for performing a method of any of aspects 13 through 18.

Aspect 24: A non-transitory computer-readable medium storing code for wireless communication at a second network node, the code comprising instructions executable by a processor to perform a method of any of aspects 13 through 18.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first network node, comprising:
    receiving, in a first time interval, one or more interference signals from a second network node on at least a portion of uplink resources used by the first network node to receive from a first set of wireless devices served by the first network node in the first time interval, wherein a measurement procedure is performed for the one or more interference signals from the second network node according to a measurement time window that is aligned with a reference signal from the second network node or that is aligned with a timing for one or more uplink signals from the first set of wireless devices served by the first network node; and
    transmitting, to the second network node based at least in part on the measurement procedure, an identifier associated with the second network node as an aggressor network node and an indication that the second network node is to modify transmission on downlink resources used by the second network node to transmit to a second set of wireless devices served by the second network node.

2. The method of claim 1, wherein transmitting the indication that the second network node is to modify transmission on the downlink resources comprises:
    transmitting, to the second network node, a signal configured to indicate modifying the transmission on the downlink resources.

3. The method of claim 1, wherein transmitting the indication that the second network node is to modify transmission on the downlink resources comprises:
    transmitting, to the second network node, an indication of a set of resources on which full duplex operation is disallowed by the second network node or transmission by the second network node on downlink is disallowed during one or more time periods during which the first network node is receiving on uplink.

4. The method of claim 1, wherein transmitting the indication that the second network node is to modify transmission on the downlink resources comprises:
    transmitting, to the second network node, an indication of a set of resources on which full duplex operation or transmission by the second network node is allowed during one or more time periods according to a transmit power backoff value.

5. The method of claim 1, wherein transmitting the indication that the second network node is to modify transmission on the downlink resources comprises:
    transmitting, to the second network node, an indication of one or more beam configurations that the second network node is restricted from using on resources of full duplex operation or for transmission by the second network node on downlink during one or more time periods during which the first network node is receiving on uplink.

6. The method of claim 1, further comprising:
    receiving the reference signal associated with a cross-link interference measurement procedure; and
    determining the identifier associated with the second network node based at least in part on the reference signal associated with the cross-link interference measurement procedure.

7. The method of claim 1, wherein transmitting the indication that the second network node is to modify transmission on the downlink resources comprises:
    transmitting, to the second network node, an identifier of a transmission reception point associated with the second network node that the second network node is restricted from using.

8. The method of claim 7, wherein the identifier of the transmission reception point is associated with a control resource set pool index or a physical cell identifier.

9. The method of claim 1, further comprising:
    determining to transmit to the second network node the indication to modify transmission on the downlink resources based at least in part on identifying that synchronization signal blocks received from the second network node are associated with a higher reference signal received power (RSRP) than a threshold value or the RSRP for the synchronization signal blocks are within a receive power range.

10. The method of claim 9, wherein:
    an indication of the threshold value, the receive power range, or both, are transmitted by the first network node;
    an indication of the threshold value, the receive power range, or both, are received from a distributed unit or a central unit in communication with the first network node; or
    the threshold value, the receive power range, or both are configured at the first network node.

11. A method for wireless communication at a second network node, comprising:
    transmitting a first set of one or more downlink messages on downlink resources to a second set of wireless devices served by the second network node, a first set of wireless devices served by a first network node, wherein the first set of one or more downlink messages is transmitted during a measurement time window that is aligned with a reference signal from the second network node or that is aligned with a timing for one or more uplink signals from the first set of wireless devices served by the first network node;
    receiving, from the first network node based at least in part on the first set of one or more downlink messages transmitted during the measurement time window, an identifier of the second network node as an aggressor network node and an indication that the second network node is to modify transmission on the downlink resources; and
    transmitting a second set of one or more downlink messages on the downlink resources to the second set of wireless devices in accordance with the indication to modify transmission on the downlink resources.

12. The method of claim 11, wherein receiving the indication that the second network node is to modify transmission on the downlink resources comprises:

receiving, from the first network node, a reference signal configured to indicate modifying the transmission on the downlink resources.

13. The method of claim 11, wherein receiving the indication that the second network node is to modify transmission on the downlink resources comprises:
receiving, from the first network node, an indication of a set of resources on which full duplex operation is disallowed by the second network node or transmission by the second network node on downlink is disallowed during one or more time periods during which the first network node is receiving on uplink.

14. The method of claim 11, wherein receiving the indication that the second network node is to modify transmission on the downlink resources comprises:
receiving, from the first network node, an indication of a set of resources on which full duplex operation or transmission by the second network node is allowed during one or more time periods according to a transmit power backoff value.

15. The method of claim 11, wherein receiving the indication that the second network node is to modify transmission on the downlink resources comprises:
receiving, from the first network node, an indication of one or more beam configurations that the second network node is restricted from using on resources of full duplex operation or for transmission by the second network node on downlink during one or more time periods during which the first network node is receiving on uplink.

16. The method of claim 11, wherein receiving the indication that the second network node is to modify transmission on the downlink resources comprises:
receiving, from the first network node, an identifier of a transmission reception point associated with the second network node that the second network node is restricted from using.

17. An apparatus for wireless communication at a first network node, comprising:
one or more processors;
memory coupled with the one or more processors; and
instructions stored in the memory and executable by the one or more processors to cause the apparatus to:
receive, in a first time interval, one or more interference signals from a second network node on at least a portion of uplink resources used by the first network node to receive from a first set of wireless devices served by the first network node in the first time interval, wherein a measurement procedure is performed for the one or more interference signals from the second network node according to a measurement time window that is aligned with a reference signal from the second network node or that is aligned with a timing for one or more uplink signals from the first set of wireless devices served by the first network node; and
transmit, to the second network node based at least in part on the measurement procedure, an identifier associated with the second network node as an aggressor network node and an indication that the second network node is to modify transmission on downlink resources used by the second network node to transmit to a second set of wireless devices served by the second network node.

18. The apparatus of claim 17, wherein the instructions are further executable by the one or more processors to transmit the indication that the second network node is to modify transmission on the downlink resources by being executable by the one or more processors to:
transmit, to the second network node, a signal configured to indicate modifying the transmission on the downlink resources.

19. The apparatus of claim 17, wherein the instructions are further executable by the one or more processors to transmit the indication that the second network node is to modify transmission on the downlink resources by being executable by the one or more processors to:
transmit, to the second network node, an indication of a set of resources on which full duplex operation is disallowed by the second network node or transmission by the second network node on downlink is disallowed during one or more time periods during which the first network node is receiving on uplink.

20. The apparatus of claim 17, wherein the instructions are further executable by the one or more processors to transmit the indication that the second network node is to modify transmission on the downlink resources by being executable by the one or more processors to:
transmit, to the second network node, an indication of a set of resources on which full duplex operation or transmission by the second network node is allowed during one or more time periods according to a transmit power backoff value.

21. The apparatus of claim 17, wherein the instructions are further executable by the one or more processors to transmit the indication that the second network node is to modify transmission on the downlink resources by being executable by the one or more processors to:
transmit, to the second network node, an indication of one or more beam configurations that the second network node is restricted from using on resources of full duplex operation or for transmission by the second network node on downlink during one or more time periods during which the first network node is receiving on uplink.

22. The apparatus of claim 17, wherein the instructions are further executable by the one or more processors to cause the apparatus to:
receive the reference signal associated with a cross-link interference measurement procedure; and
determine the identifier associated with the second network node based at least in part on the reference signal associated with the cross-link interference measurement procedure.

23. The apparatus of claim 17, wherein the instructions are further executable by the one or more processors to transmit the indication that the second network node is to modify transmission on the downlink resources by being executable by the one or more processors to:
transmit, to the second network node, an identifier of a transmission reception point associated with the second network node that the second network node is restricted from using.

24. The apparatus of claim 23, wherein the identifier of the transmission reception point is associated with a control resource set pool index or a physical cell identifier.

25. The apparatus of claim 17, wherein the instructions are further executable by the one or more processors to cause the apparatus to:
determine to transmit to the second network node the indication to modify transmission on the downlink resources based at least in part on identifying that synchronization signal blocks received from the second network node are associated with a higher reference signal received power (RSRP) than a threshold value or the RSRP for the synchronization signal blocks are within a receive power range.

26. An apparatus for wireless communication at a second network node, comprising:
one or more processors;
memory coupled with the one or more processors; and
instructions stored in the memory and executable by the one or more processors to cause the apparatus to:
transmit a first set of one or more downlink messages on downlink resources to a second set of wireless devices served by the second network node, a first set of wireless devices served by a first network node, wherein the first set of one or more downlink messages is transmitted during a measurement time window that is aligned with a reference signal from the second network node or that is aligned with a timing for one or more uplink signals from the first set of wireless devices served by the first network node;
receive, from the first network node based at least in part on the first set of one or more downlink messages transmitted during the measurement time window, an identifier of the second network node as an aggressor network node and an indication that the second network node is to modify transmission on the downlink resources; and
transmit a second set of one or more downlink messages on the downlink resources to the second set of wireless devices in accordance with the indication to modify transmission on the downlink resources.

* * * * *